US011995915B2

(12) United States Patent
Nicastri et al.

(10) Patent No.: US 11,995,915 B2
(45) Date of Patent: *May 28, 2024

(54) SYSTEMS AND METHODS FOR COLLECTING VIDEO CLIP EVIDENCE FROM A PLURALITY OF VIDEO STREAMS OF A VIDEO SURVEILLANCE SYSTEM

(71) Applicant: Honeywell International Inc., Charlotte, NC (US)

(72) Inventors: James Nicastri, Sydney (AU); Samir Dudani, Sydney (AU); Michael Rowlinson, Sydney (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,574

(22) Filed: Oct. 14, 2022

(65) Prior Publication Data
US 2023/0038059 A1 Feb. 9, 2023

Related U.S. Application Data

(63) Continuation of application No. 16/837,195, filed on Apr. 1, 2020, now Pat. No. 11,495,024.

(51) Int. Cl.
*G06V 40/16* (2022.01)
*G06F 16/735* (2019.01)
(Continued)

(52) U.S. Cl.
CPC .......... *G06V 40/172* (2022.01); *G06F 16/735* (2019.01); *G06F 16/75* (2019.01);
(Continued)

(58) Field of Classification Search
None
See application file for complete search history.

(56) References Cited

U.S. PATENT DOCUMENTS

| 6,188,777 B1 * | 2/2001 | Darrell | G06V 40/10 348/169 |
| 7,627,199 B2 | 12/2009 | Sato et al. | |
| (Continued) | | | |

FOREIGN PATENT DOCUMENTS

CN 101505412 A 8/2009

OTHER PUBLICATIONS

European Extended Search Report, EP Application No. 21164436.4, dated Jul. 20, 2021 (8 pgs).

*Primary Examiner* — Delomia L Gilliard
(74) *Attorney, Agent, or Firm* — Seager, Tufte & Wickhem, LLP

(57) ABSTRACT

A video surveillance system and computer assisted method stores video streams of numerous video cameras installed throughout a facility (e.g., a school, an airport, etc.) and batch searches those video streams for relevant video frames that may show an individual with certain predetermined facial features. In some examples, the search range is limited by a specified time window, by certain designated cameras, and/or by certain predetermined areas of the facility. From those video streams, a collection of video clips containing the relevant video frames are identified and batch exported for later analysis by video surveillance personnel. In some examples, the collected video clips are compiled into a single composite video with the video clips being arranged by time for convenient and efficient viewing. In addition or alternatively, in some examples, the video clips are stored as separate files in a directory for viewing the video clips individually.

20 Claims, 21 Drawing Sheets

(51) Int. Cl.
*G06F 16/75* (2019.01)
*G06F 16/78* (2019.01)
*G06F 16/783* (2019.01)
*G06F 18/22* (2023.01)
*G06V 20/40* (2022.01)
*G06V 20/52* (2022.01)

(52) U.S. Cl.
CPC ........ *G06F 16/784* (2019.01); *G06F 16/7867* (2019.01); *G06F 18/22* (2023.01); *G06V 20/49* (2022.01); *G06V 20/52* (2022.01); *G06V 40/166* (2022.01)

(56) References Cited

U.S. PATENT DOCUMENTS

| | | | |
|---|---|---|---|
| 8,010,402 B1 * | 8/2011 | Sharma | G06Q 99/00 |
| | | | 705/7.29 |
| 8,401,252 B2 | 3/2013 | Schneiderman et al. | |
| 9,087,386 B2 | 7/2015 | Morris et al. | |
| 2008/0080743 A1 * | 4/2008 | Schneiderman | G08B 13/196 |
| | | | 382/118 |
| 2010/0013931 A1 * | 1/2010 | Golan | G06T 7/70 |
| | | | 348/150 |
| 2011/0292232 A1 * | 12/2011 | Zhang | H04N 23/90 |
| | | | 348/222.1 |
| 2013/0039634 A1 | 2/2013 | M | |
| 2017/0278265 A1 * | 9/2017 | Yamamoto | H04N 23/90 |
| 2018/0357981 A1 * | 12/2018 | Ng | G06Q 30/0269 |
| 2020/0082851 A1 | 3/2020 | Chau et al. | |

\* cited by examiner

FIG. 3

64 — receiving one or more characteristics of the designated individual

66 — batch searching the plurality of video streams for video frames that include an individual with characteristics matching the one or more received characteristics of the designated individual

68 — for each video stream that has at least one video frame including an individual with characteristics matching the one or more received characteristics of the designated individual, extracting one or more video clips from the respective video stream, wherein each extracted video clip includes one or more video frames with an individual having characteristics matching the one or more received characteristics of the designated individual

70 — for each video stream that has at least one video frame including an individual with characteristics matching the one or more received characteristics of the designated individual, associating each of the one or more video clips with the video camera corresponding to the respective video stream

72 — batch exporting the video clips to a storage device, including the association of each of the video clips with the respective one of the plurality of video cameras

74 — associating each of the one or more video clips with a corresponding time, and batch exporting the association of each of the video clips with the corresponding time

SYSTEMS AND METHODS FOR COLLECTING VIDEO CLIP EVIDENCE FROM A PLURALITY OF VIDEO STREAMS OF A VIDEO SURVEILLANCE SYSTEM

This is a continuation of co-pending U.S. patent application Ser. No. 16/837,195, filed Apr. 1, 2020, and entitled "SYSTEMS AND METHODS FOR COLLECTING VIDEO CLIP EVIDENCE FROM A PLURALITY OF VIDEO STREAMS OF A VIDEO SURVEILLANCE SYSTEM", which is incorporated herein by reference.

TECHNICAL FIELD

The disclosure relates generally to video surveillance systems and more particularly to systems and methods for searching and managing recorded video streams of a plurality of video cameras.

BACKGROUND

Video surveillance systems often include numerous video cameras installed at various locations throughout a facility (e.g., a school, a business, an airport, etc.). The video cameras can be used for monitoring suspicious or otherwise noteworthy activity, such as crimes, accidents, disruptions, lost children, etc. Many video surveillance systems also include some type of video management system for storing and retrieving recorded video streams for analysis by facility security professionals and law enforcement.

SUMMARY

The present disclosure generally pertains to video surveillance systems and computer assisted methods for storing video streams of a plurality of video cameras installed throughout a facility (e.g., a school, an airport, etc.) and batch searching those video streams for relevant video frames that show, for example, an individual with certain predetermined facial or other characteristics. From those video streams, a collection of video clips containing the relevant video frames are identified, and in some cases, batch exported for later analysis by video surveillance personnel.

In some examples of the disclosure, the search range may be limited by a specified time window, by certain designated cameras, and/or by certain predetermined areas of the facility. In some examples of the disclosure, the collected video clips may be compiled into a single composite video with the video clips being arranged by time for convenient and efficient viewing. In some examples of the disclosure, the video clips may be stored as separate files in a directory for viewing the video clips individually.

The preceding summary is provided to facilitate an understanding of some of the features of the present disclosure and is not intended to be a full description. A full appreciation of the disclosure can be gained by taking the entire specification, claims, drawings and abstract as a whole.

BRIEF DESCRIPTION OF THE DRAWINGS

The disclosure may be more completely understood in consideration of the following description of various illustrative embodiments of the disclosure in connection with the accompanying drawings in which:

FIG. 3 is a flow diagram showing an example method for gathering video clips;

Figure 1:
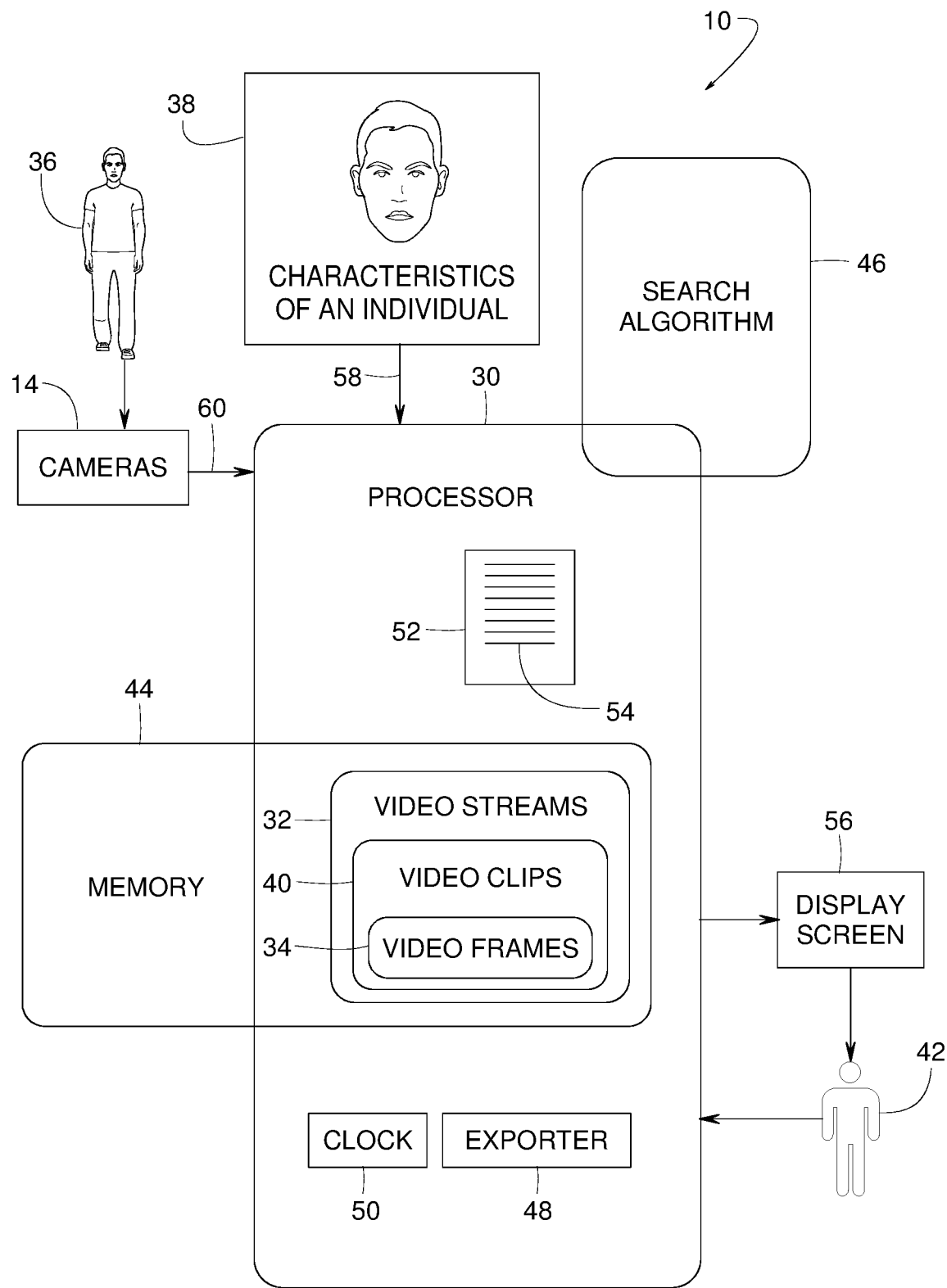
FIG. 1 is a schematic block diagram of an example video surveillance system.

While the disclosure is amendable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the disclosure.

In some examples, the disclosure pertains to a video surveillance system and computer assisted method for storing video streams of numerous video cameras installed throughout a facility (e.g., a school, an airport, etc.) and batch searching those video streams for relevant video frames that show, for example, a designated individual with certain predetermined facial or other characteristics. In some examples, the search range may be limited by a specified time window, by certain designated cameras, and/or by certain predetermined areas of the facility. From those video streams, a collection of video clips containing the relevant video frames may be identified by a search algorithm and batch exported for later analysis by video surveillance personnel. In some examples, the collected video clips are compiled into a single composite video and sorted by time for convenient and efficient viewing. In addition or alternatively, in some examples, the video clips are stored as separate files in a directory for viewing the video clips individually.

Figure 2:
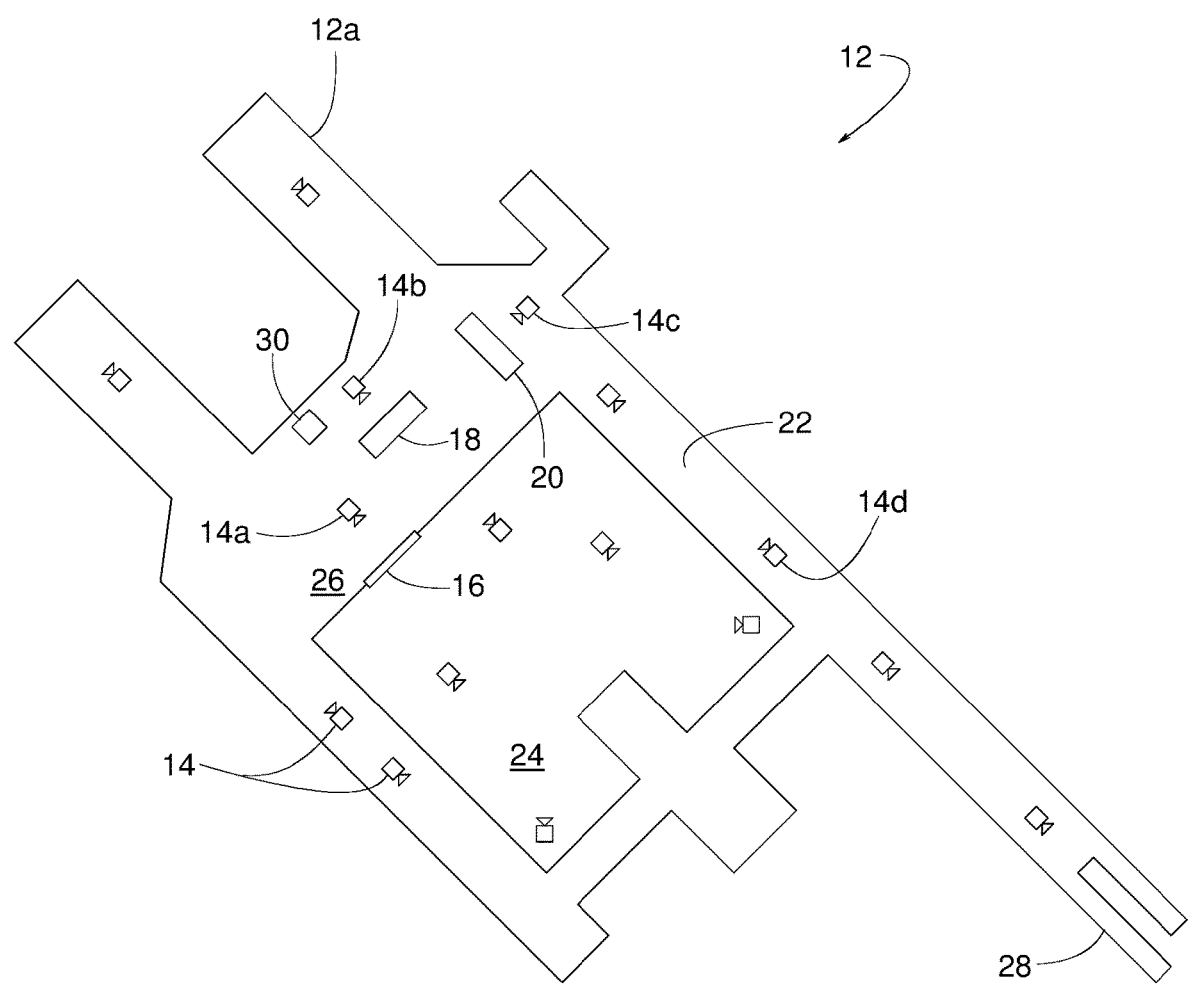
FIG. 2 is a schematic diagram of an example facility where the video surveillance system of FIG. 1 is being used.

FIG. 1 schematically illustrates an example video surveillance system 10 for use at a facility 12 (e.g., a single building, a group of buildings, an airport 12a, a campus, a predefined outdoor area, a park, fairgrounds, a worksite, a parking lot, a neighborhood, etc.). Video surveillance system 10 provides a method for efficiently searching through a plethora of video recordings for spotting, for example, certain individuals of interest. For sake of example, video surveillance system 10 will be described with reference to its use at airport 12a and searching for an individual with certain facial characteristics, as shown in FIG. 2. However, it should be recognized that the present disclosure can be applied to any suitable location, and may be used to search for an individual with any other suitable characteristic(s) such as height, weight, clothing type, clothing color, color and/or type of carried or towed bag, walking gait, race, age, gender, activity (sitting, walking, running, loitering) and/or any other suitable characteristic(s). Also, it should be recognized that the present disclosure can be used to search for a particular group of individuals (child with older man) or activities of groups of individuals (e.g. an individual setting an item down and another individual picking up the same item). These are just examples.

In the illustrated example of FIGS. 1 and 2, a plurality of video cameras 14 (e.g., a first camera 14a, a second camera 14b, a third camera 14c, a fourth camera 14d, and/or even hundreds or thousands of other video cameras) are installed in various areas of airport 12a. The terms, "video camera" and "camera," as used herein, are equivalent and used interchangeably. Video cameras 14 are often used for monitoring and recording suspicious or otherwise noteworthy activity (e.g., crimes, accidents, disruptions, lost children, the movement or whereabouts of certain individuals, etc.). Some example areas of airport 12a include a terminal building entrance 16, a baggage and ticketing area 18, a security area 20, a concourse 22, a parking ramp 24, a baggage claim area 26, and a gate 28.

In some examples, video surveillance system 10 includes a processor 30 for managing a plurality of video streams 32 recorded by video cameras 14. Some examples of system 10 search video streams 32 from multiple cameras 14 to find video frames 34 that show a designated individual 36 with predefined characteristics 38 (e.g., facial characteristics of the designated individual 36). Some example facial characteristics include, face landmarks (e.g., nose, eyes, facial hair, glasses, etc.), skin color, hair color, gender, and age. Based on an image comparison analysis performed by a search algorithm 46, processor 30 identifies a plurality of video clips 40 containing relevant video frames 34 from the plurality of cameras 14 and then, in some examples, compiles and organizes them for easier and more efficient analysis by video surveillance personnel 42.

In the illustrative example shown in FIG. 1, video surveillance system 10 includes processor 30 for receiving and managing video streams 32 from cameras 14; a memory 44 (a storage device) for storing video streams 32, video clips 40 and video frames 34 thereof; search algorithm 46 used by processor 30 for finding video frames 34 having an image of a designated individual 36 based on certain characteristics 38 of the individual; an exporter 48 of processor 30 for exporting relevant video clips 40; and a clock 50 to help sort video clips 40 in order of time.

Processor 30 is schematically illustrated to represent any computer, computing device, computer system, digital device, digital circuit, controller, one or more components thereof and/or combinations thereof. The term "processor" is not limited to a "microprocessor". Examples of processor 30 can be in various forms such as a single component or a plurality of interacting components, wherein at least one of the components includes a computer readable medium 52 having stored thereon, in a non-transitory state, an executable program code 54 that, when executed, causes certain intended physical outcomes. Some examples of such physical outcomes include displaying search results on a display screen 56 (e.g., one or more computer monitors); receiving and processing input 58 identifying characteristics 38 of an individual; converting a video signal 60 from cameras 14 to a format suitable for viewing, searching, editing and exporting; and accessing search algorithm 46.

The term, "computer readable medium" refers to any device for storing information for any duration (e.g., for extended time periods, permanently, for brief instances, for temporarily buffering, for caching of the information, etc). The term, "program code" refers to executable instructions (e.g., computer readable instruction, machine readable instructions, software, etc.). The term, "non-transitory computer readable medium" is specifically defined to include any type of computer readable storage device and/or storage disk and to exclude propagating signals and to exclude transmission media.

In some examples, search algorithm 46 is a known animetrics face recognition program (e.g., running on Microsoft Azure) that can identify an image match with some computed level of confidence. The terms, "match" and "matching" refer to a comparison of images and/or features that are determined to be similar to each other, wherein the determination is with at least some acceptable level of confidence. Thus, the terms, "match" and "matching" do not necessarily mean that the compared images and/or features are exactly the same or even substantially the same. In some examples, an acceptable level of confidence is specified by video surveillance personnel 42 and/or by program code 54. In some examples, search algorithm 46 provides a computed value of its level of confidence of an image comparison (e.g. a facial recognition match). Some examples of search algorithm 46 are accessible through an API (application programming interface) between processor 30 and a remote program source such as a server, a computer system, a software program, an operating system or an internet service. In other examples, one or more portions of search algorithm 46 are stored on processor 30 and interact with executable program code 54. Searching a plurality of video streams 32 of a corresponding plurality of video cameras 14 is referred to as, "batch searching."

In some examples, processor 30 includes memory 44, which stores video streams 32, video clips 40 and video frames 34. In some examples, one or more portions of memory 44 are remotely located but accessible by processor 30 through an internet connection or through some other known communication link. Video frames 34 are individual snapshots of video clips 40. Video clips 40 are segments of video streams 32.

In some examples, exporter 48 is software for exporting video streams 32, video clips 40 and/or video frames 34 for various uses, such as, for example, for viewing, accessing, editing, storing, organizing, etc. Transferring a collection of multiple video streams 32 and/or multiple video clips 40 is referred to as, "batch exporting", which may include submitting a group of export jobs for processing on processor 30 and whose results are obtained at a later time.

FIG. 3 is a flowchart illustrating a computer assisted method 62 for gathering video clips 40 each containing an individual with characteristics matching one or more characteristics 38 of a designated individual 36 in facility 12, wherein video clips 40 are extracted from a plurality of video streams 32, each video stream 32 captured by a corresponding one of a plurality of video cameras 14 of video surveillance system 10 of facility 12. The term, "extracted," as it refers to a video clip and video stream means that the video clip is a segment of the video stream and that the video clip is handled (e.g., stored, cut, copied, played, etc.) separately from the rest of the video stream. The term, "batch extracted," is basically the same as the term "extracted" but applies to a group of video clips taken from one or more video streams, and may include submitting a group of extraction jobs for processing on processor 30 and whose results are obtained at a later time. A block 64 of FIG. 3 represents processor 30 receiving at least one characteristic 38 of designated individual 36. A block 66 represents processor 30 batch searching multiple video streams 32 for video frames 34 showing an image of an individual with characteristics matching those of designated individual 36. This may include submitting a group of search jobs for processing on processor 30 and whose results are obtained at a later time. A block 68 represents processor 30 extracting video clips 40 that include video frames 34 showing an image of an individual with characteristics matching those of designated individual 36. A block 70 represents associating the extracted video clips 40 with the corresponding video cameras 14 that recorded the respective video clips 40. A block 72 represents batch exporting the extracted video clips 40 and their association with their respective video cameras 14. A block 74 represents further associating the extracted video clips 40 with a time of when the video clips 40 were recorded.

FIGS. 4-21 show an example sequence of screenshots of display screen 56 as computer assisted method 62 is performed. In this particular example, video streams 32 have already been recorded, and searching for a designated individual 36 is performed afterwards. In other examples, however, searching may be done in real or near-real time while cameras 14 are recording. Although, computer assisted method 62 is not limited to any number of video cameras 14, video streams 32 from only four cameras 14 (cameras 14a, 14b, 14c and 14d) are shown in this illustrated example. In some cases, a user of the security system 10 may select which cameras to use, sometimes by dragging and dropping icons of the selected cameras into the middle area 76 of the display screen 56 (see FIG. 4).

Figure 4:
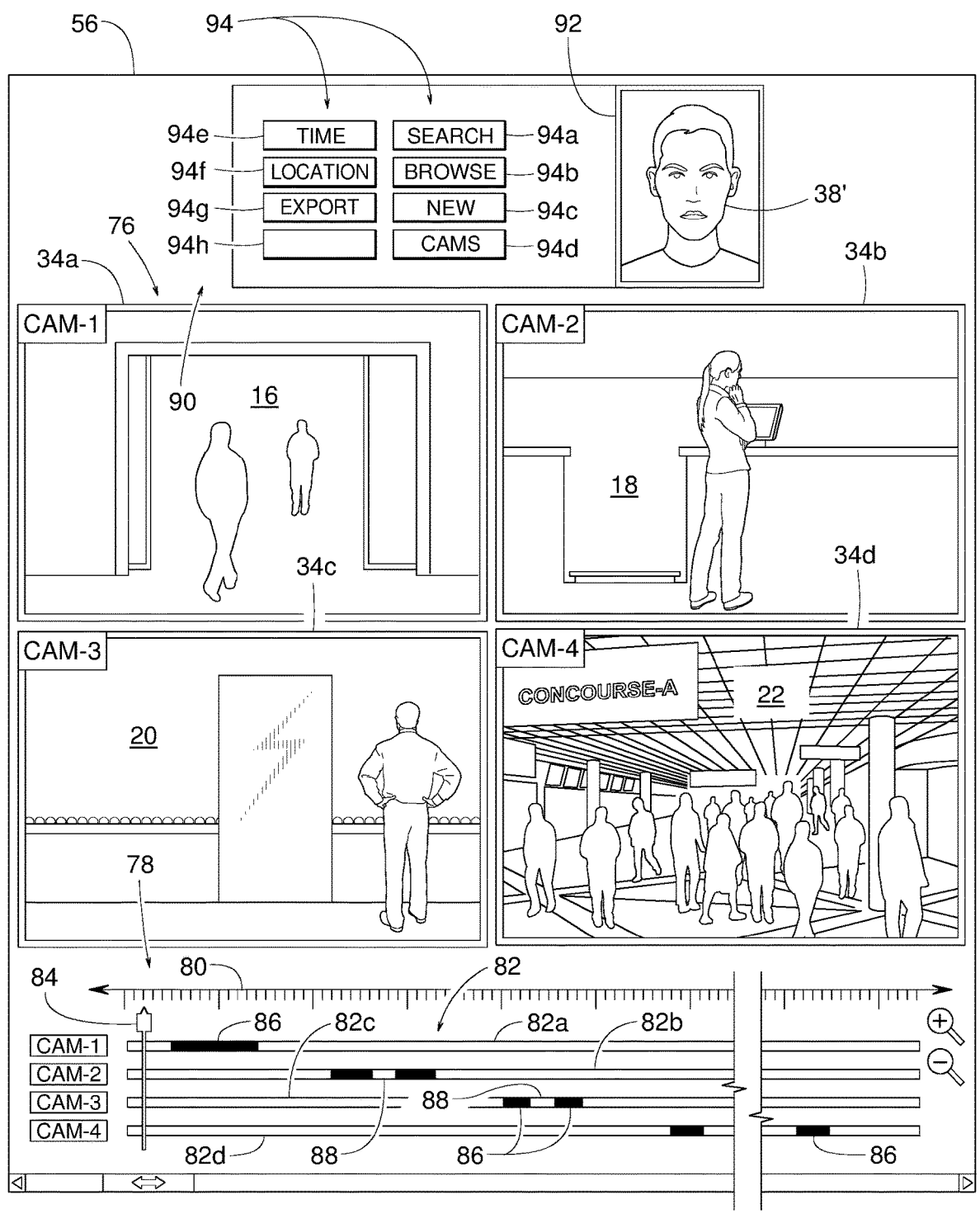
FIG. 4 is an example display screen shot of the video surveillance system of FIG. 1.

The middle area 76 of the display screen 56 shown in FIG. 4 shows ever changing video frames 34a, 34b, 34c and 34d recorded at an instant in time by video cameras 14a, 14b, 14c and 14d; respectively. Video frames 34a, 34b, 34c and 34d are labeled at CAM-1, CAM-2, CAM-3 and CAM-4; respectively, thereby associating video streams 32, video clips 40 and video frames 34 with the video cameras 14 that did the recordings. In this example, with reference to FIG. 2, video camera 14a monitors terminal building entrance 16, camera 14b monitors baggage and ticketing area 18, camera 14c monitors security area 20, and camera 14d monitors concourse 22.

In the example shown, a lower area 78 of display screen 56, shown in FIG. 4, shows a timeline 80 and a plurality of video tracks 82 (e.g., a first video track 82a, a second video track 82b, a third video track 82c and a fourth video track 82d). Lower area 78 also shows what is colloquially referred to as a play head 84. The location of play head 84 along video tracks 82 relative to timeline 80 determines which video frames 34 are shown in the middle area 76 of display screen 56. Solid black areas 86 of video tracks 82 identify confirmed areas where designated individual 36 was spotted on video streams 32. Designated individual 36 might also appear in white areas 88 of video tracks 82, but search algorithm 46 might have been unable to confirm such sightings with any significant degree of confidence.

An upper area 90 of display screen 56, shown in FIG. 4, includes a picture frame 92 and several tabs 94 (e.g., tabs 94a-h). In some examples, uploading an image 38' of the face of a designated individual 36 (e.g., image of an individual's face) provides a way for inputting characteristics 38 of an individual for which processor 30 is to perform a search function using search algorithm 46. In addition or alternatively, some examples of characteristics 38 can be inputted alphanumerically via a keyboard. Some examples of such characteristics 38 may include, hair color, number of carried bags, shirt color, height, approximate weight, sex, etc.

Tabs 94 can be used for controlling other functions of system 10. For example, a SEARCH tab 94a may initiate a search function, a BROWSE tab 94b may provide access to alternate stored examples of image 38', a NEW tab 94c may initiate another search, a CAMS tab 94d may provide a way for selecting which video streams 32 should be searched, a TIME tab 94e may provide a way for selecting which time periods should be searched, a LOCATION tab 94f may provide a way for selecting which area of facility 12 should be searched, an EXPORT tab 94g may be used for doing a batch export of video clips, and any number of additional tabs 94h may be used for various other desired functions.

For some examples, TIME tab 94e schematically illustrates video surveillance personnel 42 entering a chosen search time window and processor 30 receiving it. In response to that, processor 30 limits its search to videos recorded only during the specified search time window. In some examples, different time windows are applied to different video streams 32. This can be useful because designated individual 36 might be expected at terminal building entrance 16 possibly hours before individual 36 is expected at concourse 22. For some examples, TIME tab 94e schematically illustrates video surveillance personnel 42 entering a chosen export time window and processor 30 receiving it. In response to that, processor 30 limits its range of batch exporting video clips 40 to only those video clips falling within the specified export time window. In some examples, different export time windows are applied to different video streams 32 for the same beneficial reason for having different time windows. These are just examples.

FIGS. 4-20 illustrate an example sequence of operation of system 10, as designated individual 36 enters and travels through facility 12. The location of play head 84 along timeline 80 identifies the progression of the individual's movements.

FIG. 4 shows none of the four cameras 14a-d having spotted designated individual 36 at the point in time indicated by play head 84 on timeline 80. Consequently, processor 30 leaves each of the video tracks 82a-d white at the location of play head 84.

Figure 5:
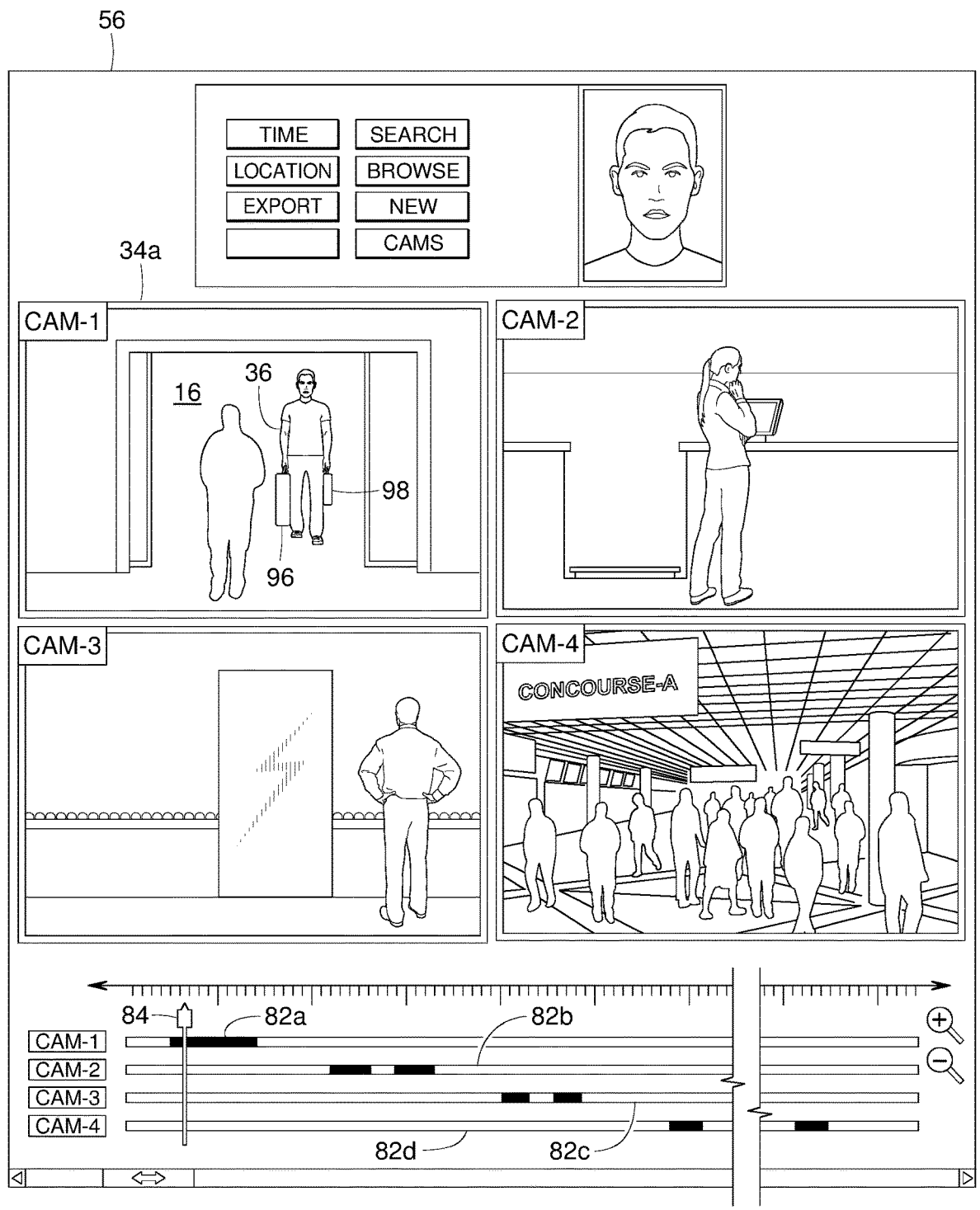
FIG. 5 is another example display screen shot of the video surveillance system of FIG. 1.

FIG. 5 shows only first camera 14a (CAM-1) having spotted designated individual 36 entering facility 12 at terminal building entrance 16. So, processor 30 blackens first video track 82a at this location of play head 84 while leaving the other video tracks 82b-d white. In this example, individual 36 is shown carrying both a large bag 96 and a small bag 98. In some cases, if the designated individual is identified multiple times close in time to one another, the processor may blacken the first video track 82a to include all of the multiple sightings. This will result in a single video clip that covers the multiple sightings rather than many very short clips. In some cases, a threshold may be specified to identify how close the sightings must be before the sightings are collapsed into a single video clip.

Figure 6:
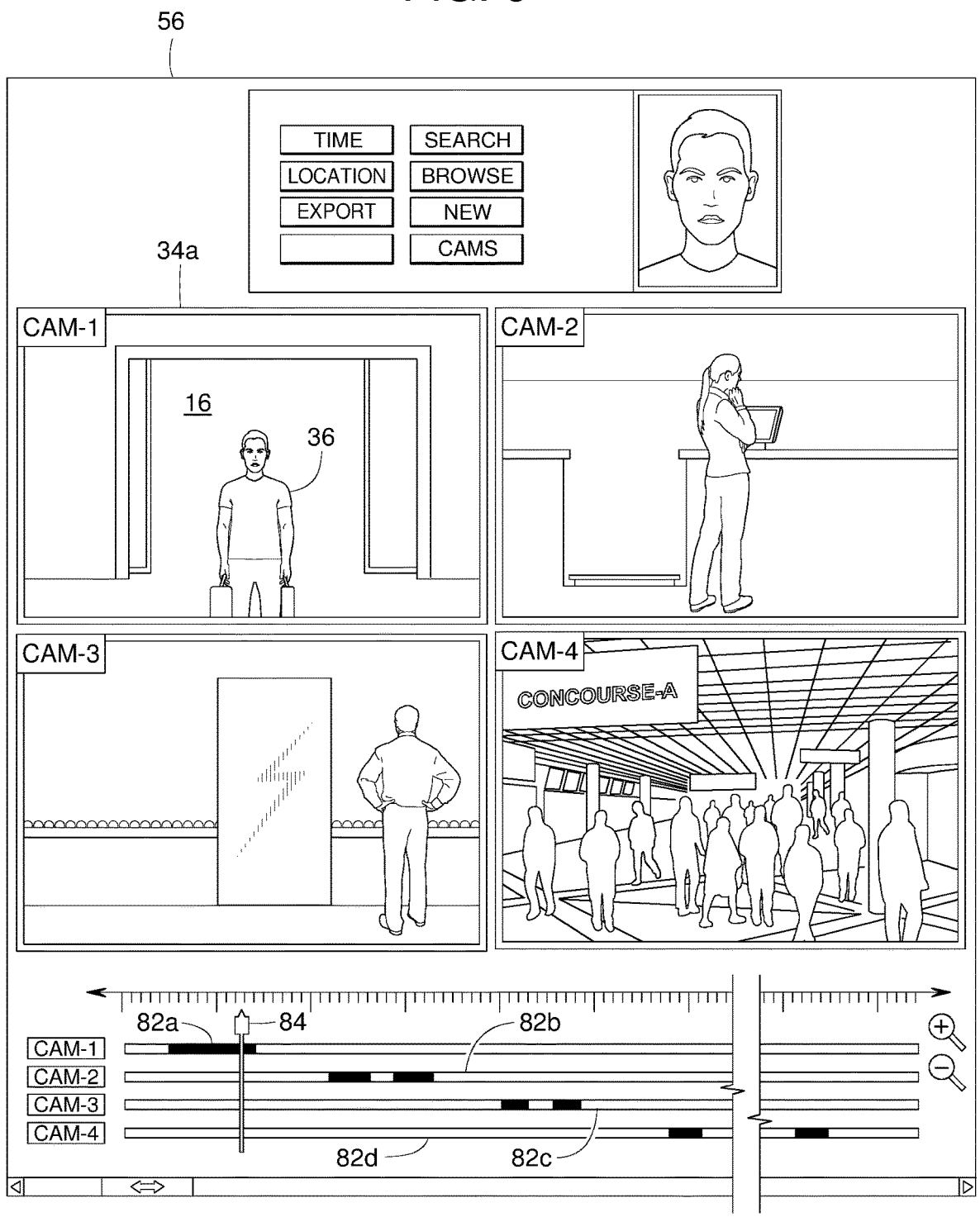
FIG. 6 is another example display screen shot of the video surveillance system of FIG. 1.

FIG. 6 shows another video frame 34a of first camera 14a with designated individual 36 still in the area of entrance 16. So, processor 30 blackens first video track 82a at this location as well, while still leaving the other video tracks 82b-d white.

Figure 7:
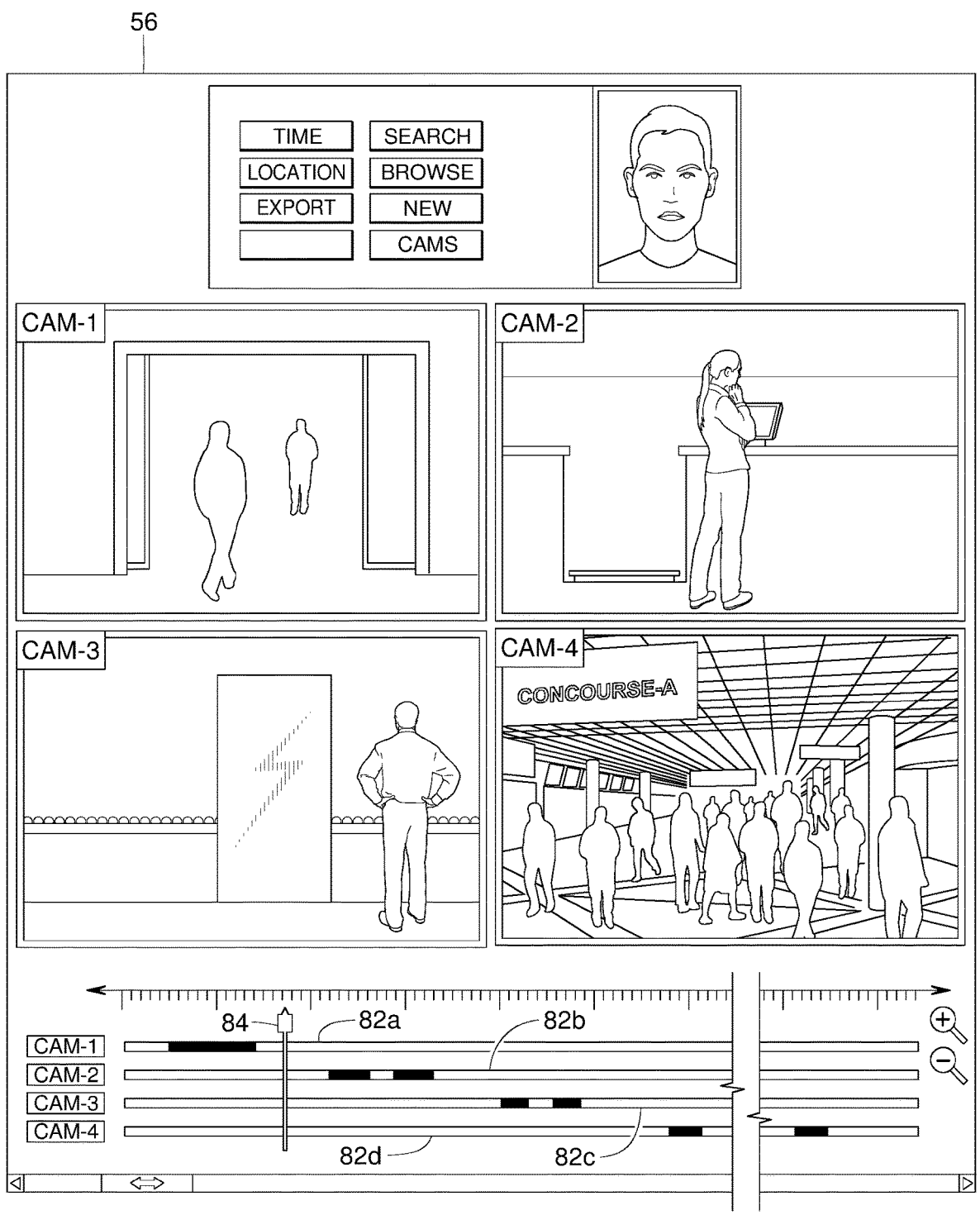
FIG. 7 is another example display screen shot of the video surveillance system of FIG. 1.

FIG. 7 shows none of the four cameras 14a-d seeing designated individual 36 at this point in time. Consequently, processor 30 leaves each of the video tracks 82a-d white at this particular location of play head 84.

Figure 8:
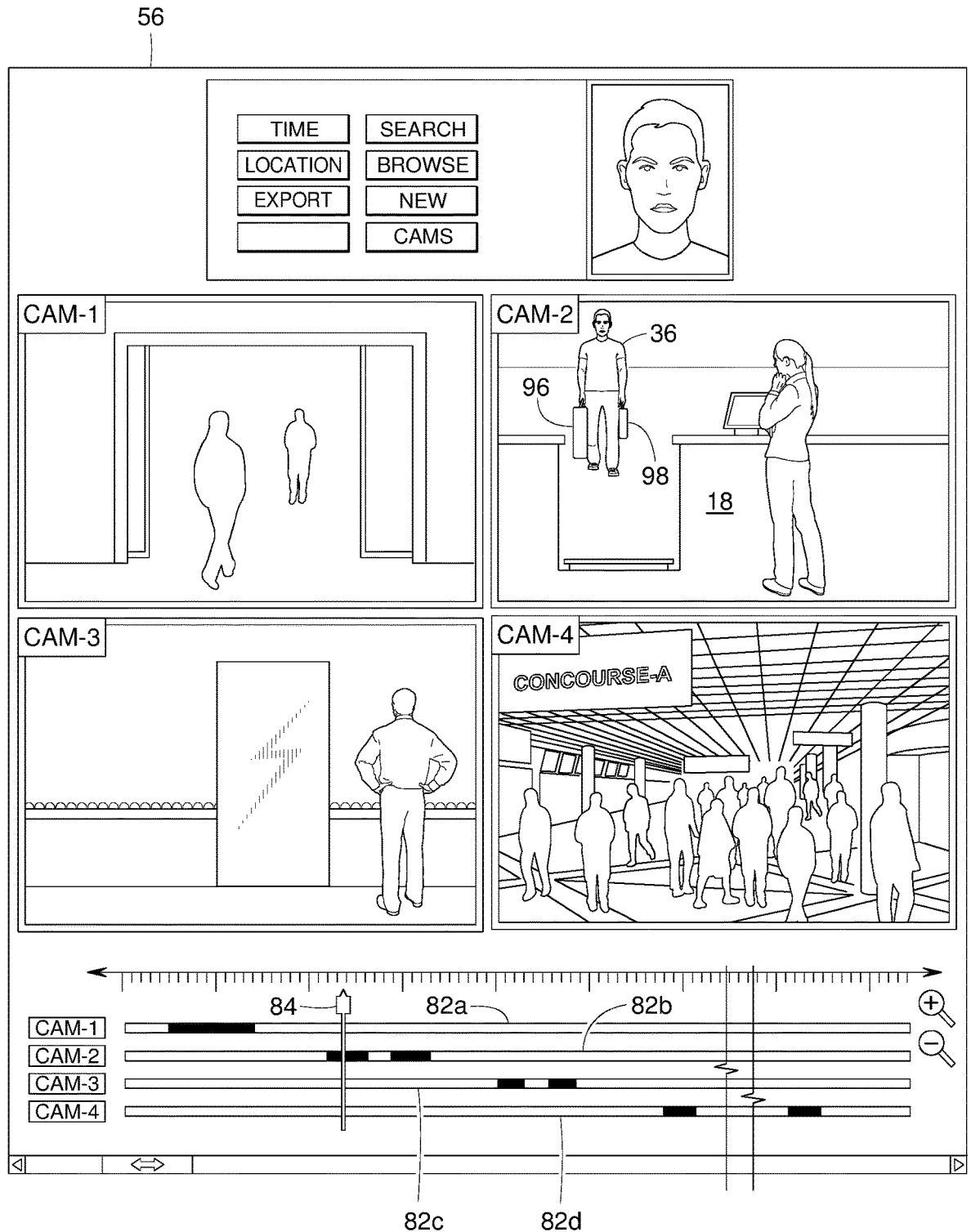
FIG. 8 is another example display screen shot of the video surveillance system of FIG. 1.

FIG. 8 shows second camera 14b (CAM-2) having spotted designated individual 36 approaching baggage and ticketing area 18. So, processor 30 blackens second video track 82b at this location of play head 84 while leaving the other video tracks 82a, 82c and 82d white.

Figure 9:
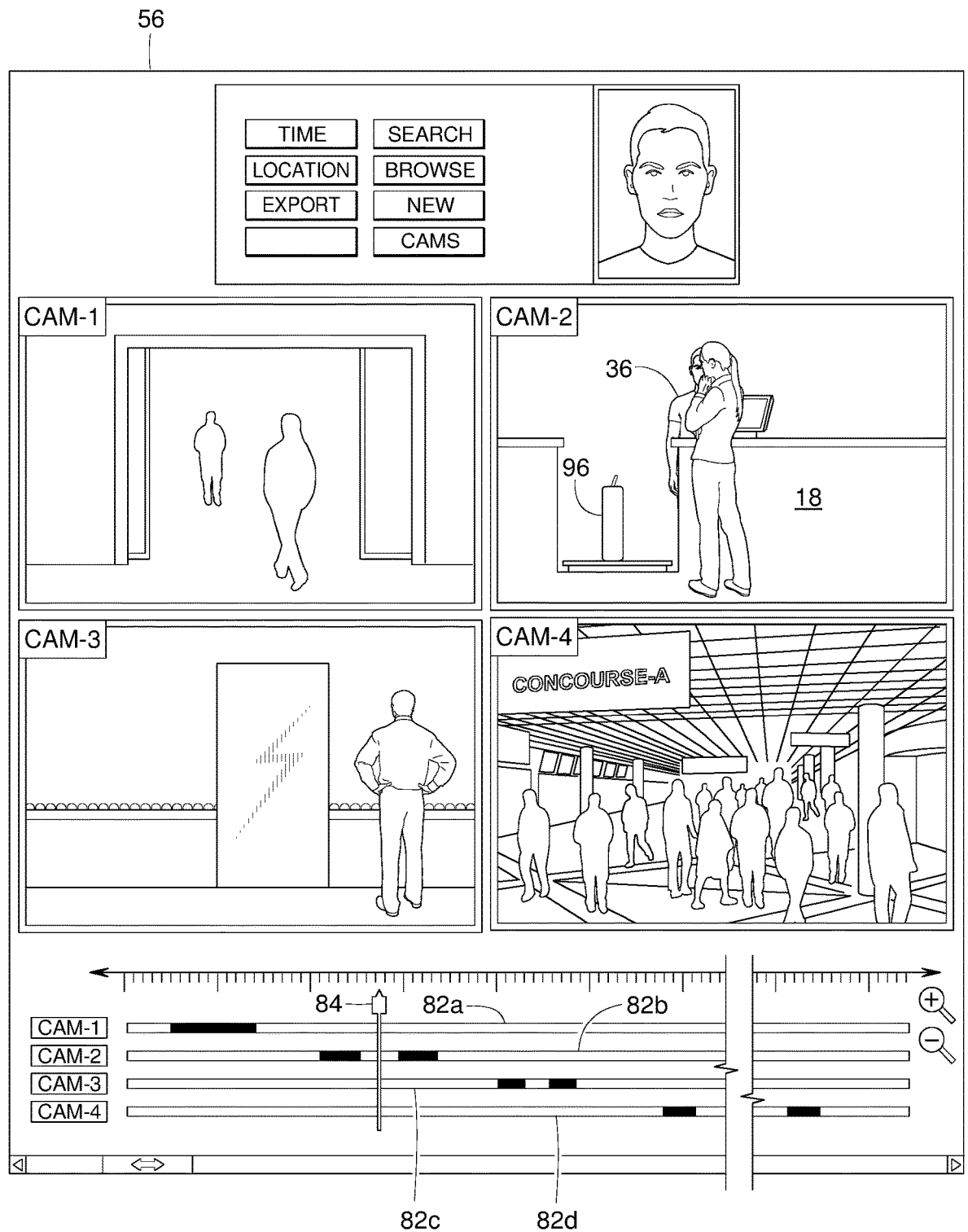
FIG. 9 is another example display screen shot of the video surveillance system of FIG. 1.

FIG. 9 shows designated individual 36 at baggage and ticketing area 18; however, search algorithm 46 fails to identify the individual's face, as the face is momentarily hidden from view. Consequently, processor 30 leaves each of the video tracks 82a-d white at this particular location of play head 84.

Figure 10:
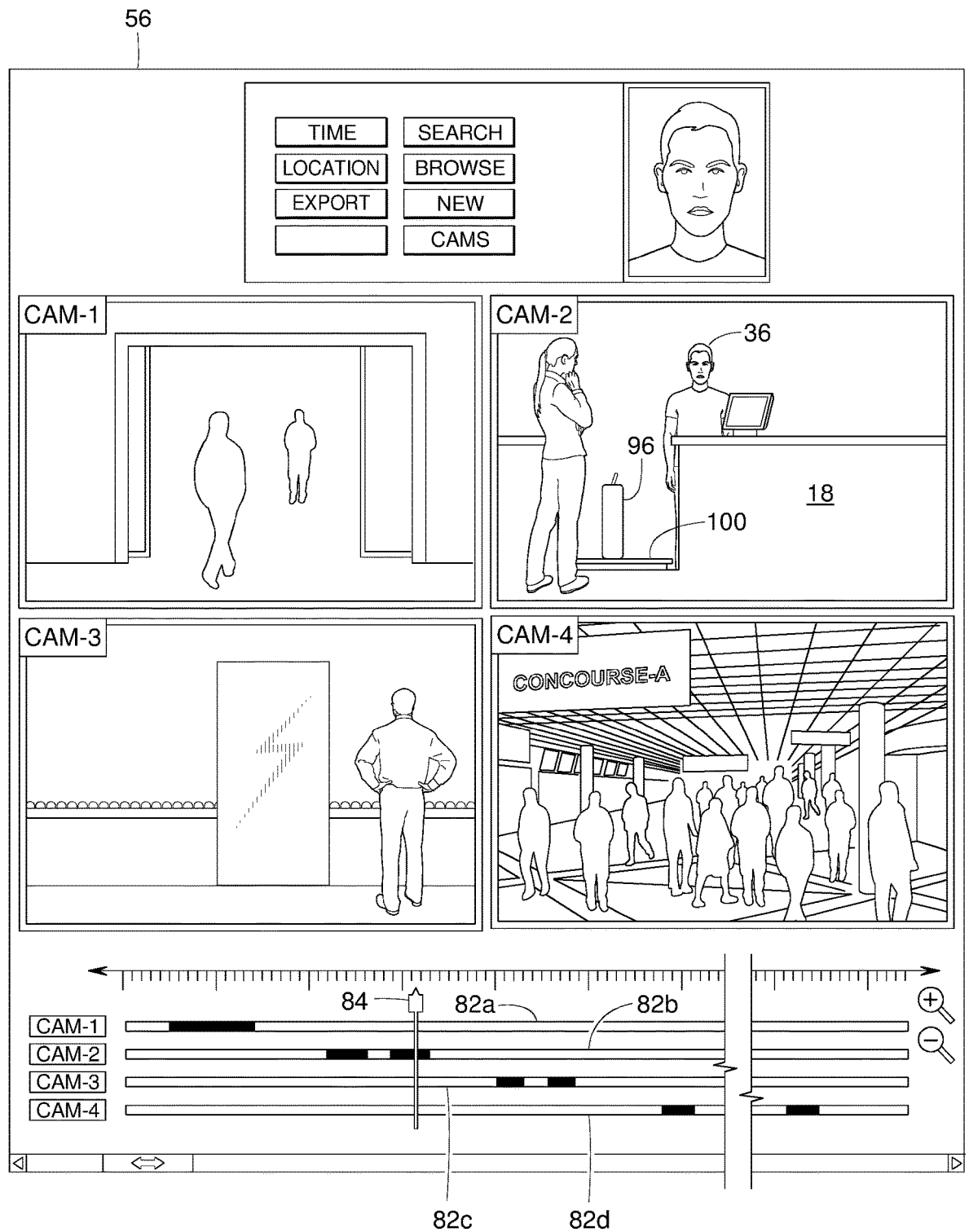
FIG. 10 is another example display screen shot of the video surveillance system of FIG. 1.

FIG. 10 shows the individual's face back in sight of second camera 14b (CAM-2). It appears that individual 36 has placed large bag 96 on a scale 100 to be weighed and checked in. With the individual's face back in view, processor 30 blackens second video track 82b at this location of play head 84 while leaving the other video tracks 82a, 82c and 82d white. In some cases, if the time period that the search algorithm 46 fails to identify the individual's face between two positive sightings (e.g. the sighing in FIG. 8 and the subsequent sighting in FIG. 10) is less than a threshold, the processor 30 may collapse the two sightings into a single video clip and blacken the second video track 82b to encompass both sightings.

Figure 11:
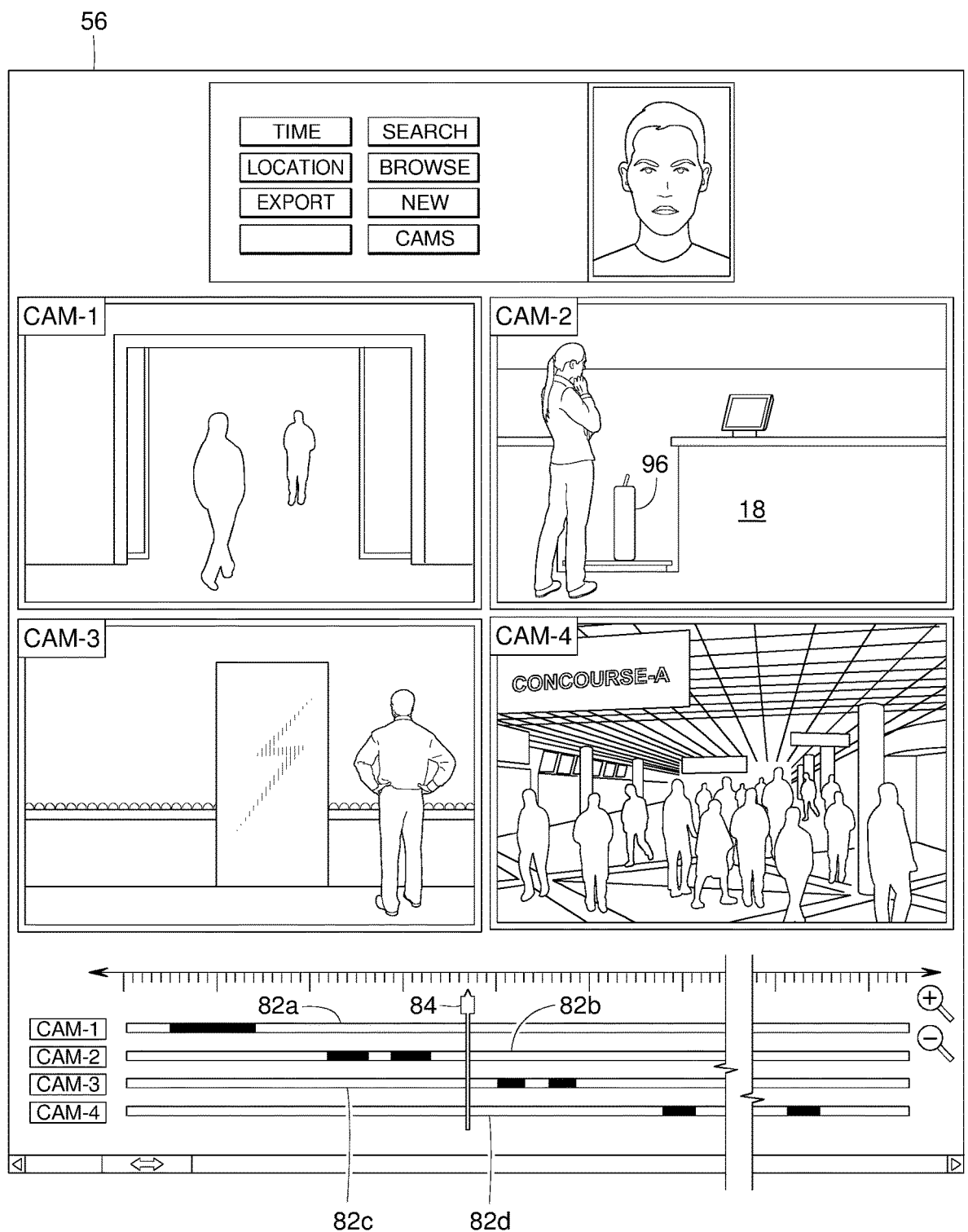
FIG. 11 is another example display screen shot of the video surveillance system of FIG. 1.

FIG. 11 shows none of the four cameras 14a-d seeing designated individual 36 at this point in time. Individual 36 apparently left the baggage and ticketing area 18 while leaving large bag 96 there for check in. With individual 36 currently out of sight, processor 30 leaves each of the video tracks 82a-d white at this particular location of play head 84.

Figure 12:
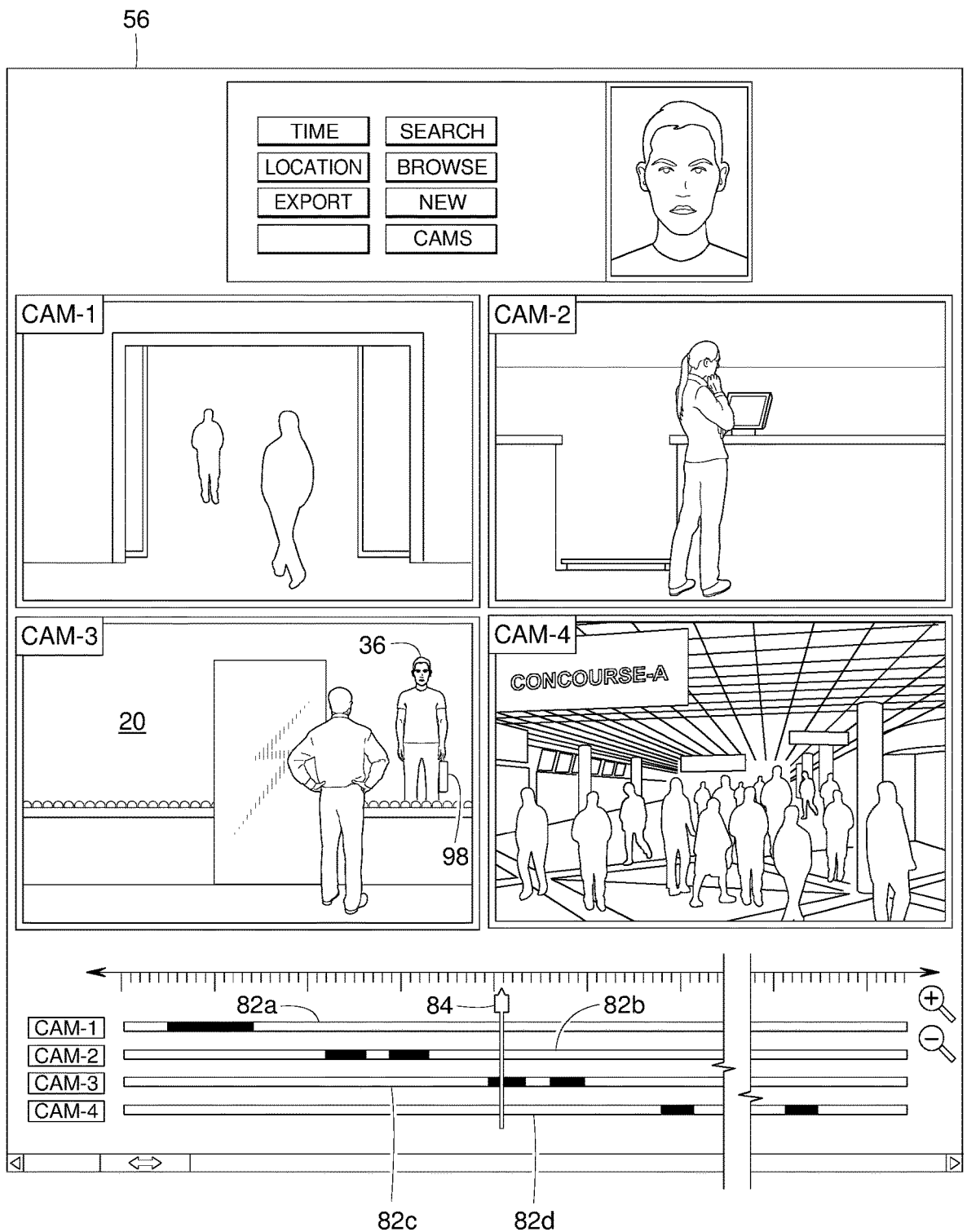
FIG. 12 is another example display screen shot of the video surveillance system of FIG. 1.

FIG. 12 shows third camera 14c (CAM-3) having sighted individual 36 at security area 20. At this point, individual 36 is only carrying small bag 98. Processor 30 blackens third video track 82c at this location of play head 84 while leaving the other video tracks 82a, 82b and 82d white.

Figure 13:
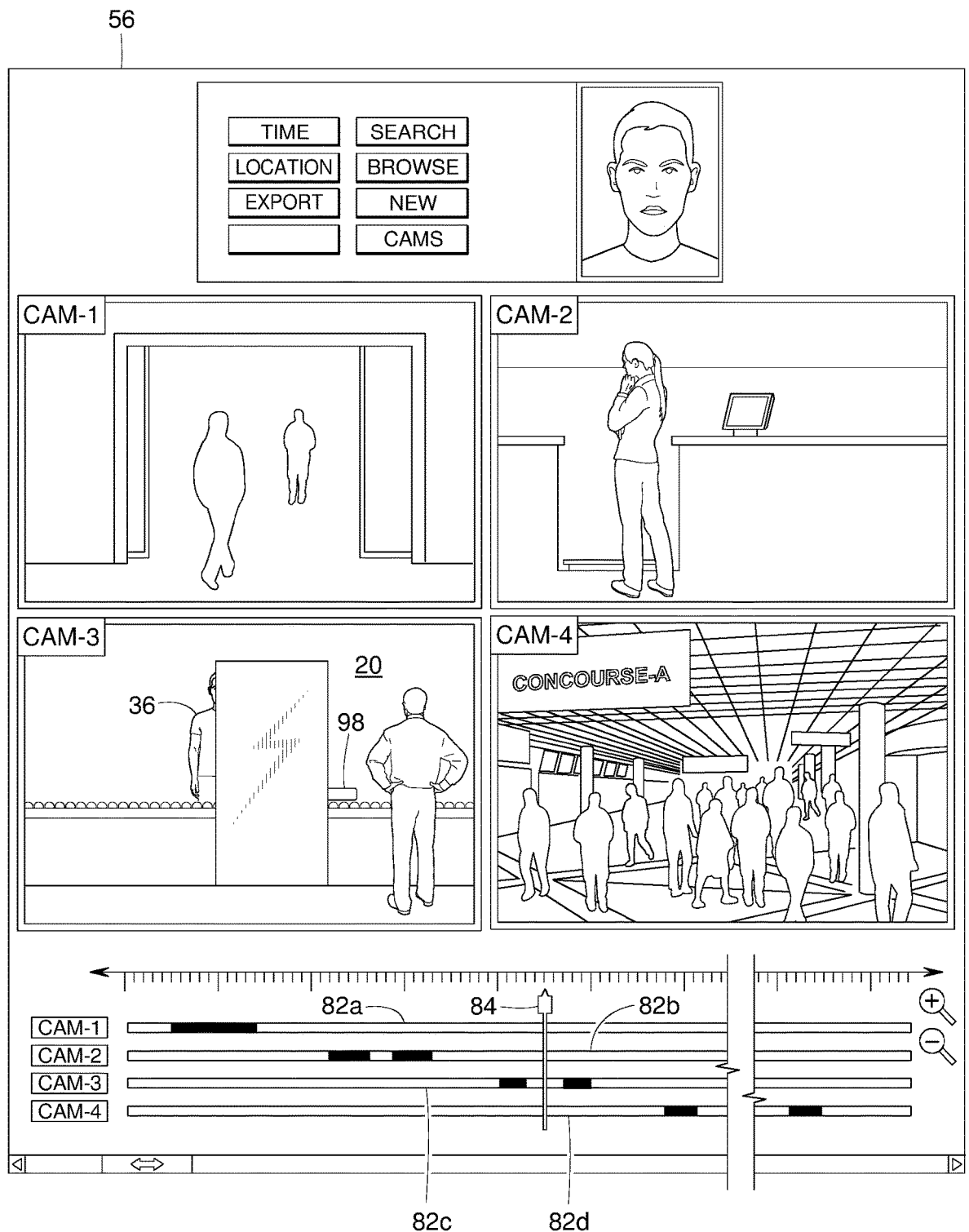
FIG. 13 is another example display screen shot of the video surveillance system of FIG. 1.

FIG. 13 shows individual 36 still at security area 20; however, search algorithm 46 fails to identify the individual's face, as the face is momentarily hidden from view from an X-ray machine. Consequently, processor 30 leaves each of the video tracks 82a-d white at this particular location of play head 84.

Figure 14:
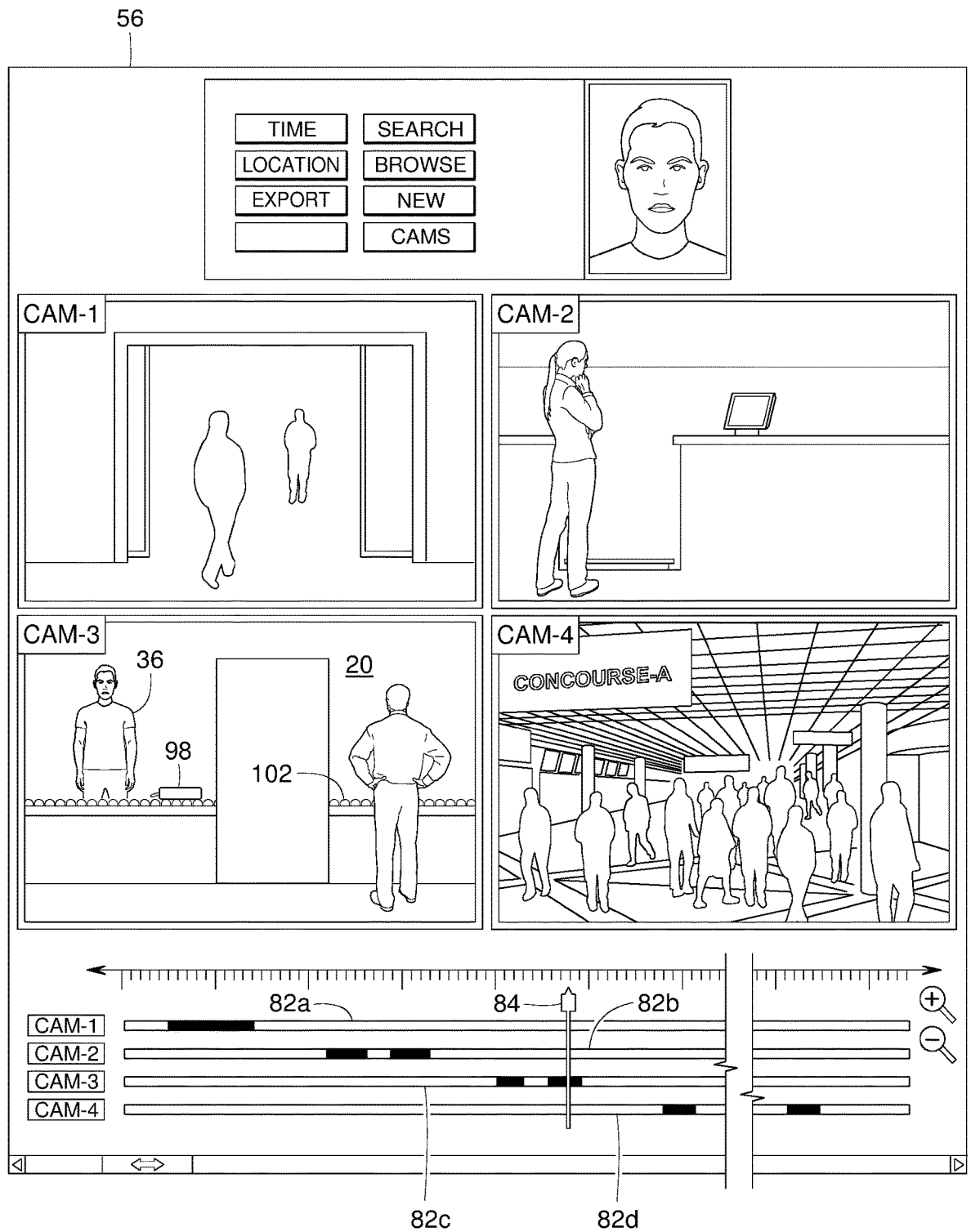
FIG. 14 is another example display screen shot of the video surveillance system of FIG. 1.

FIG. 14 shows the individual's face back in sight of third camera 14c (CAM-3). It appears that individual 36 had placed small bag 98 on a conveyor 102 to be X-rayed and is about to pick it up again. With the individual's face back in view, processor 30 blackens third video track 82b at this location of play head 84 while leaving the other video tracks 82a, 82b and 82d white. Again, in some cases, if the time period that the search algorithm 46 fails to identify the individual's face between two positive sightings (e.g. the sighing in FIG. 12 and the subsequent sighting in FIG. 14) is less than a threshold, the processor 30 may collapse the two sightings into a single video clip and blacken the third video track 82c to encompass both sightings.

Figure 15:
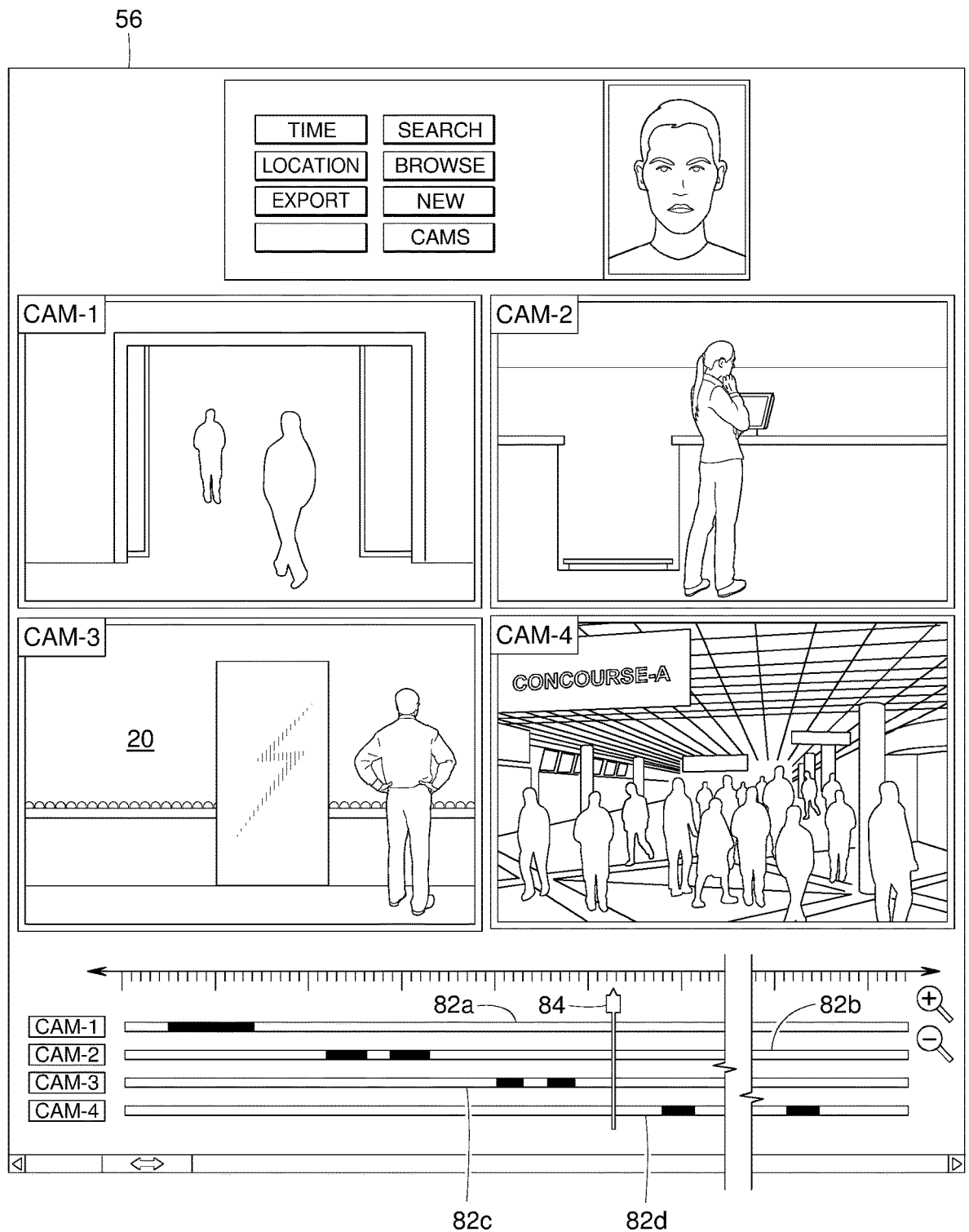
FIG. 15 is another example display screen shot of the video surveillance system of FIG. 1.

FIG. 15 shows none of the four cameras 14a-d seeing designated individual 36 at this point in time. Individual 36 apparently left security area 20 and is heading somewhere else. With individual 36 currently out of sight, processor 30 leaves each of the video tracks 82a-d white at this particular location of play head 84.

Figure 16:
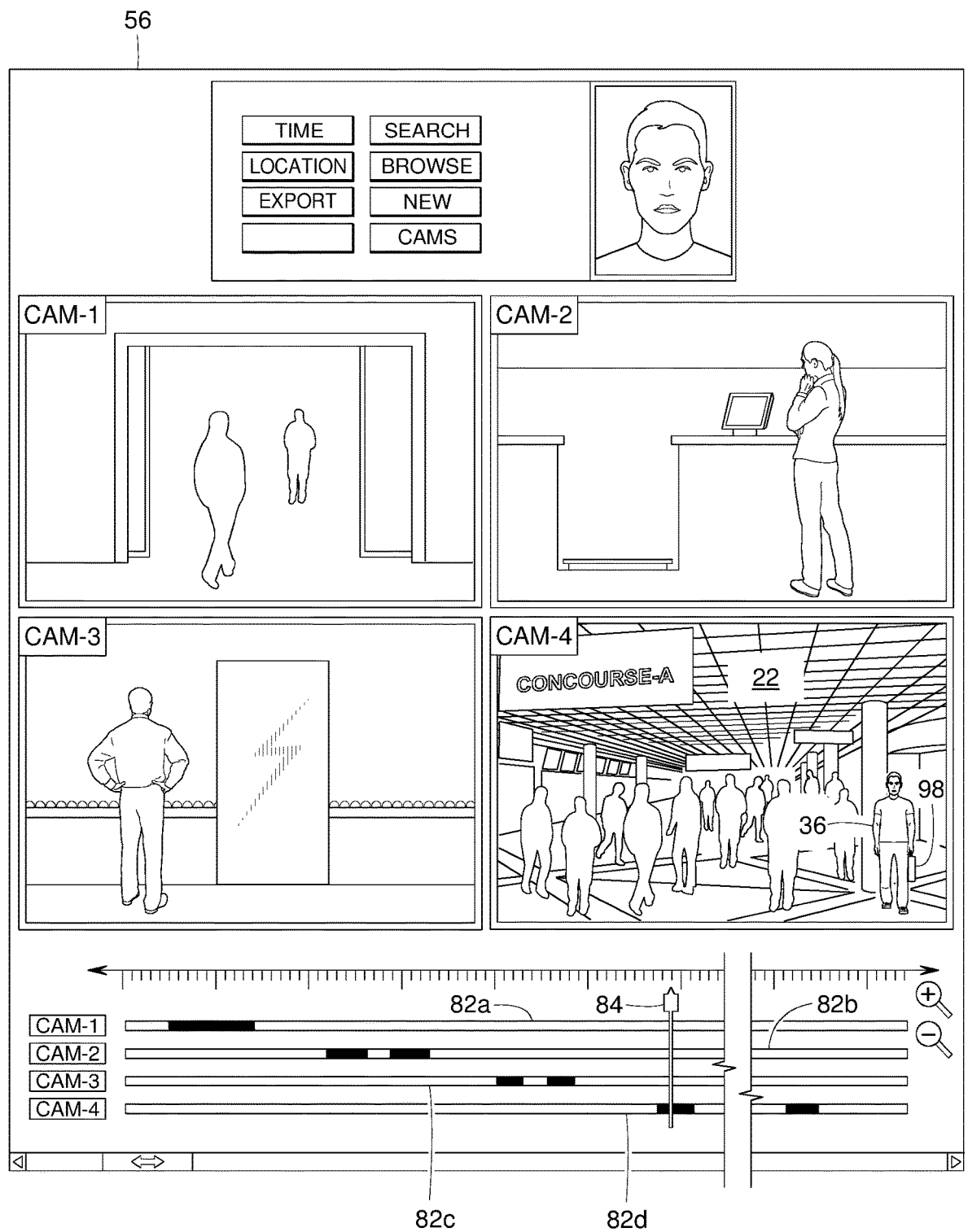
FIG. 16 is another example display screen shot of the video surveillance system of FIG. 1.

FIG. 16 shows fourth camera 14d (CAM-4) having sighted individual 36 in concourse 22. At this point, individual 36 is only carrying small bag 98. Processor 30 blackens fourth video track 82d at this location of play head 84 while leaving the other video tracks 82a, 82b and 82c white.

Figure 17:
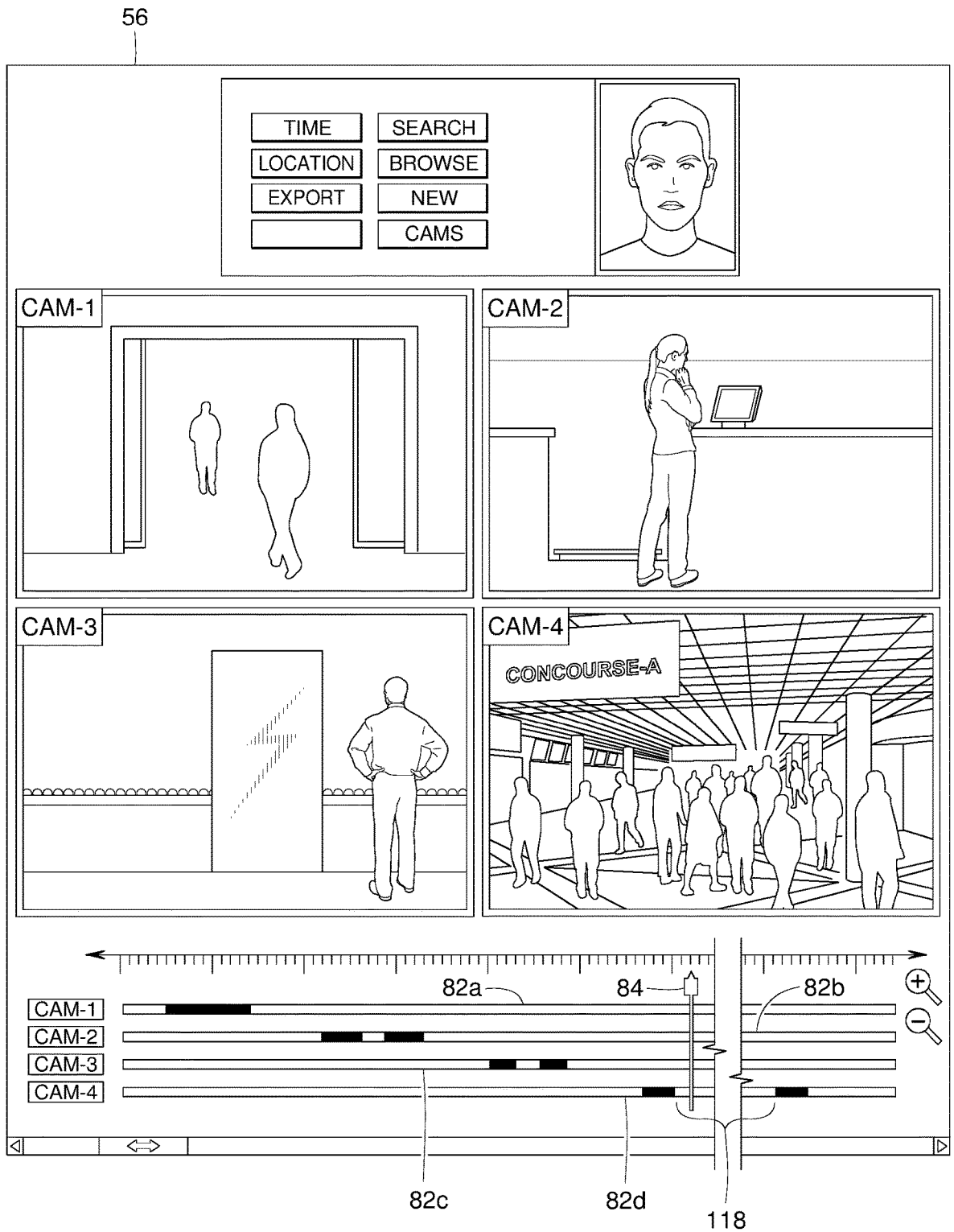
FIG. 17 is another example display screen shot of the video surveillance system of FIG. 1.

FIG. 17 shows none of the four cameras 14a-d seeing designated individual 36 at this point in time. Individual 36 may have stopped somewhere to eat or walked to a gate or another concourse in facility 12. With individual 36 currently out of sight, processor 30 leaves each of the video tracks 82a-d white at this particular location of play head 84.

Figure 18:
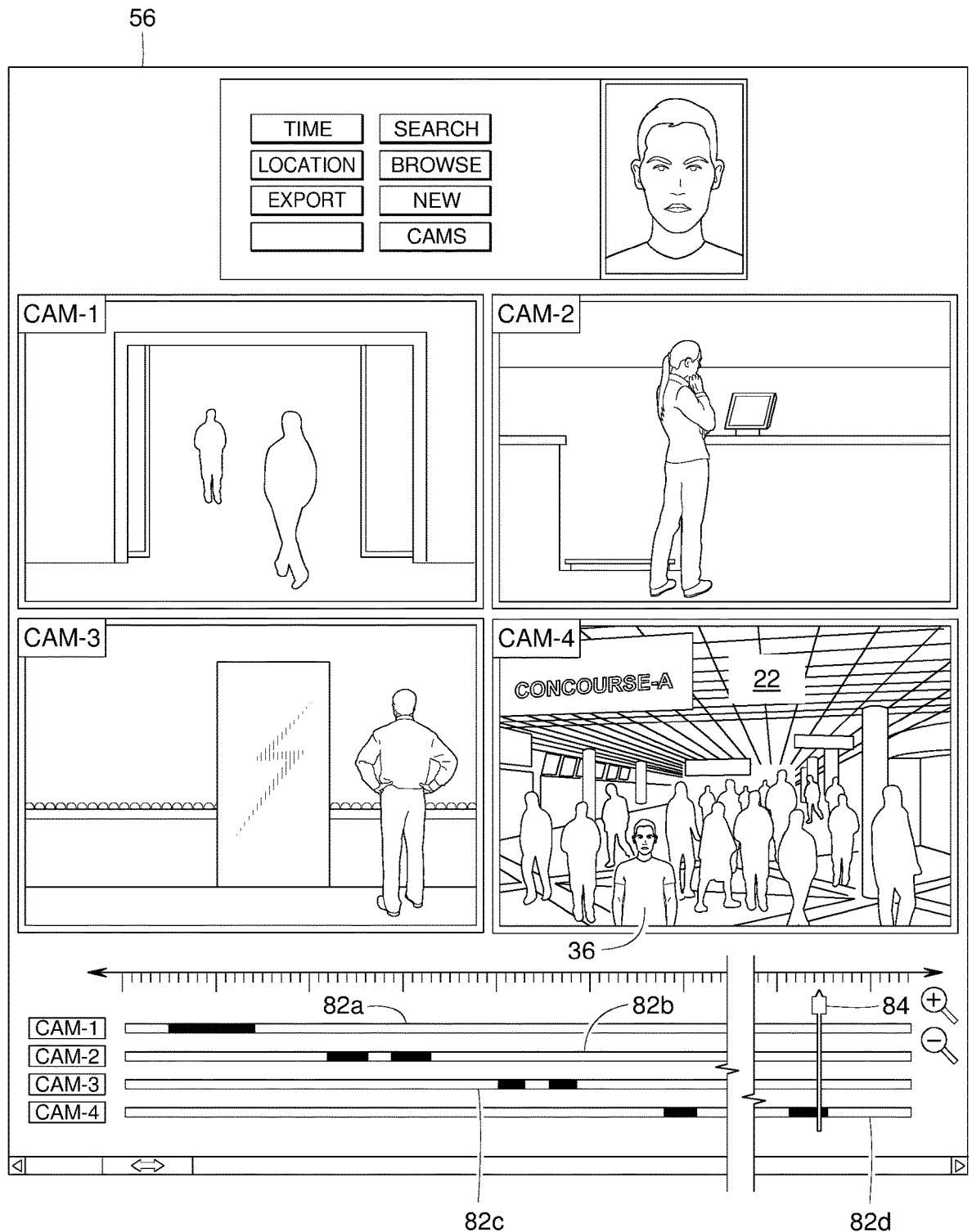
FIG. 18 is another example display screen shot of the video surveillance system of FIG. 1.

FIG. 18 shows that after an extended period of time, fourth video camera 14d (CAM-4) spots individual 36 one last time in concourse 22. For this last sighting, processor 30 blackens fourth video track 82 at this location of play head 84 while leaving the other video tracks 82a, 82b and 82c white. Since individual 36 is not sighted again, individual 36 may have boarded a plane and left the airport. With no further sightings, processor 30 sets each of the video tracks 82a-d to white from this point forward.

With the batch search completed, relevant video clips 40 are identified (corresponding to the blackened portions of the video tracks 82a-d), extracted, compiled, organized and/or stored. The relevant video clips 40 may be batch exported for later viewing by security personnel in an efficient manner. In some examples, one or more of these functions may be performed manually, automatically, or a combination of the two. In some cases, video surveillance personnel 42 may initiate the batch exporting of some or all of the relevant video clips 40 by selecting the export button 94g (see FIG. 4).

Figure 19:
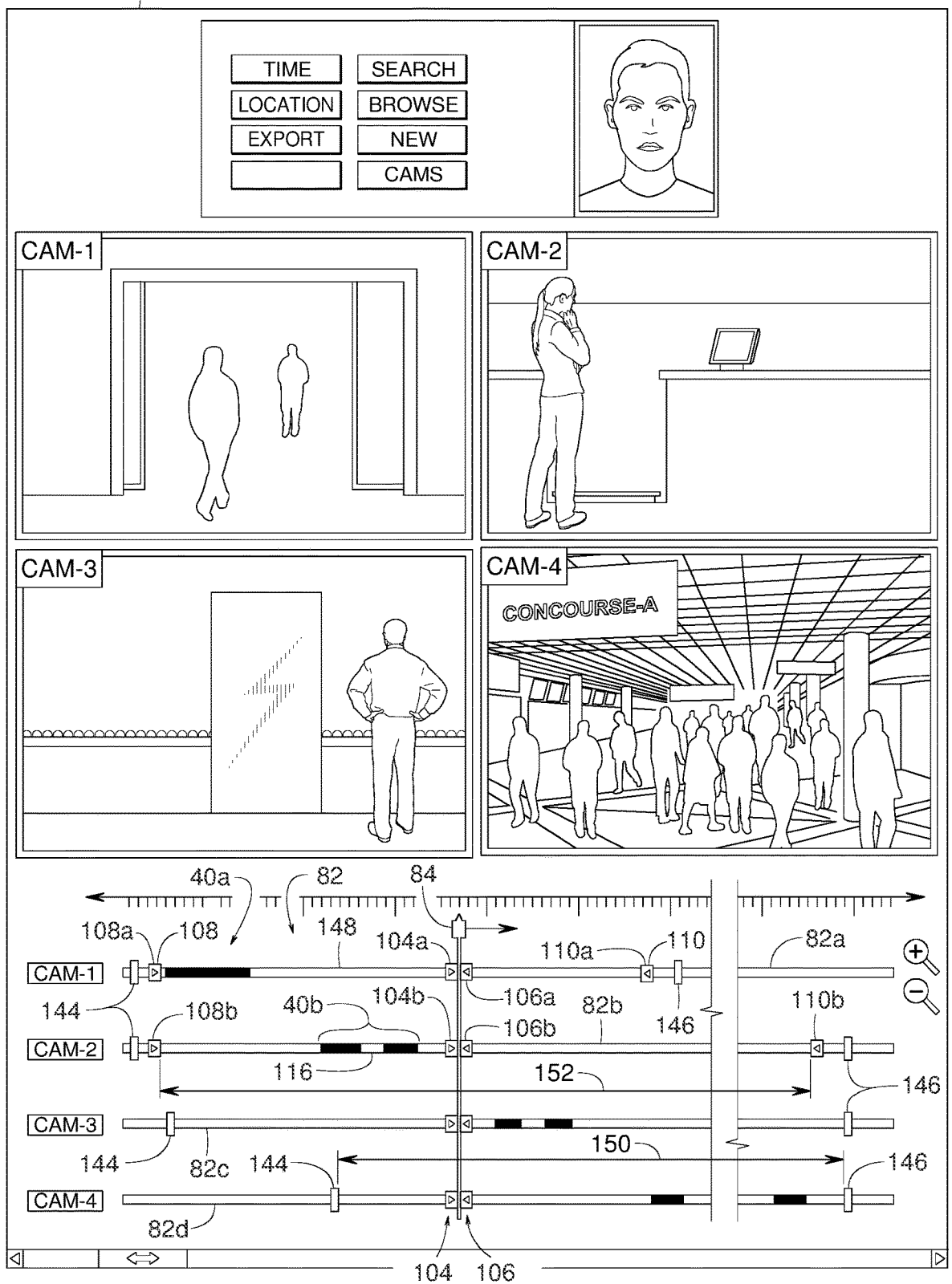
FIG. 19 is another example display screen shot of the video surveillance system of FIG. 1.

In some examples, as shown in FIG. 19, video surveillance personnel 42 can position start bars 144 and stop bars 146 on video tracks 82 to define desired search windows for each camera 14 in which search algorithm 46 will search. Bars 144 and 146, for example, define a search window 150 for video track 82b of fourth video camera 14d. Specifying desired search windows (e.g., search window 150) may be used for reducing the time required for batch searching since only relevant time periods of video streams 32 will be searched.

In some examples, as also shown in FIG. 19, video surveillance personnel 42 may review the video streams 32 by directing play head 84 to scan video tracks 82. In the example illustrated in FIG. 19, start buttons 104 and stop buttons 106 have been added to play head 84. Video surveillance personnel 42 may use buttons 104 and 106 for respectively marking start points 108 and stop points 110, which define a chosen export time window (e.g., an export time window 152 for video track 82b of second video camera 14b). In some examples, one or more video clips 40 lying within a specified export time window (e.g., within export time window 152) may then be exported for later viewing and analysis. In some example, when multiple video clips 40 lie within the same export time window, the video clips 40 are batch exported as multiple individual files. In some examples, a video recording spanning the full length of a specified export window is exported as a single file, wherein some examples of such a single file include multiple video clips 40.

Referring also to FIG. 19, a start button 104a, for example, may be used for setting a start point 108a on first video track 82a, and a stop button 106a may be used for setting a stop point 110a. Points 108a and 110a then define at least a first video clip 40a (a segment of first video track 82a) that shows individual 36 at the terminal building entrance 16 (FIGS. 5 and 6). In some examples, first video clip 40a may also include an extended recorded period 148 after the blackened portion of video track 82a.

Likewise, a start button 104b may be used for setting a start point 108b on second video track 82b, and a stop button 106b may be used for setting a stop point 110b. Points 108b and 110b then define at least a second video clip 40b (a segment of second video track 82b) that shows individual 36 at the baggage and ticketing area 18 (FIGS. 8-10). In some examples, video clip 40b may also include extended recorded periods before and after the blackened portions of video track 82b.

Although search algorithm 46 failed to detect individual 36 momentarily (FIG. 9), that portion 116 of the video stream 82b is still included in second video clip 40b to avoid creating an overly disjointed collection of video clips 40. Moreover, if the non-detection period 116 is relatively brief and momentary, such a period may still provide relevant information. In some examples, video surveillance personnel 42 determines whether to include such a non-detection period 116. In other examples, processor 30 automatically determines whether to include non-detection period 116 based on the period's duration. For instance, in some examples, processor 30 includes non-detection periods of less than a certain amount of time, e.g., less than seven seconds.

Figure 20:
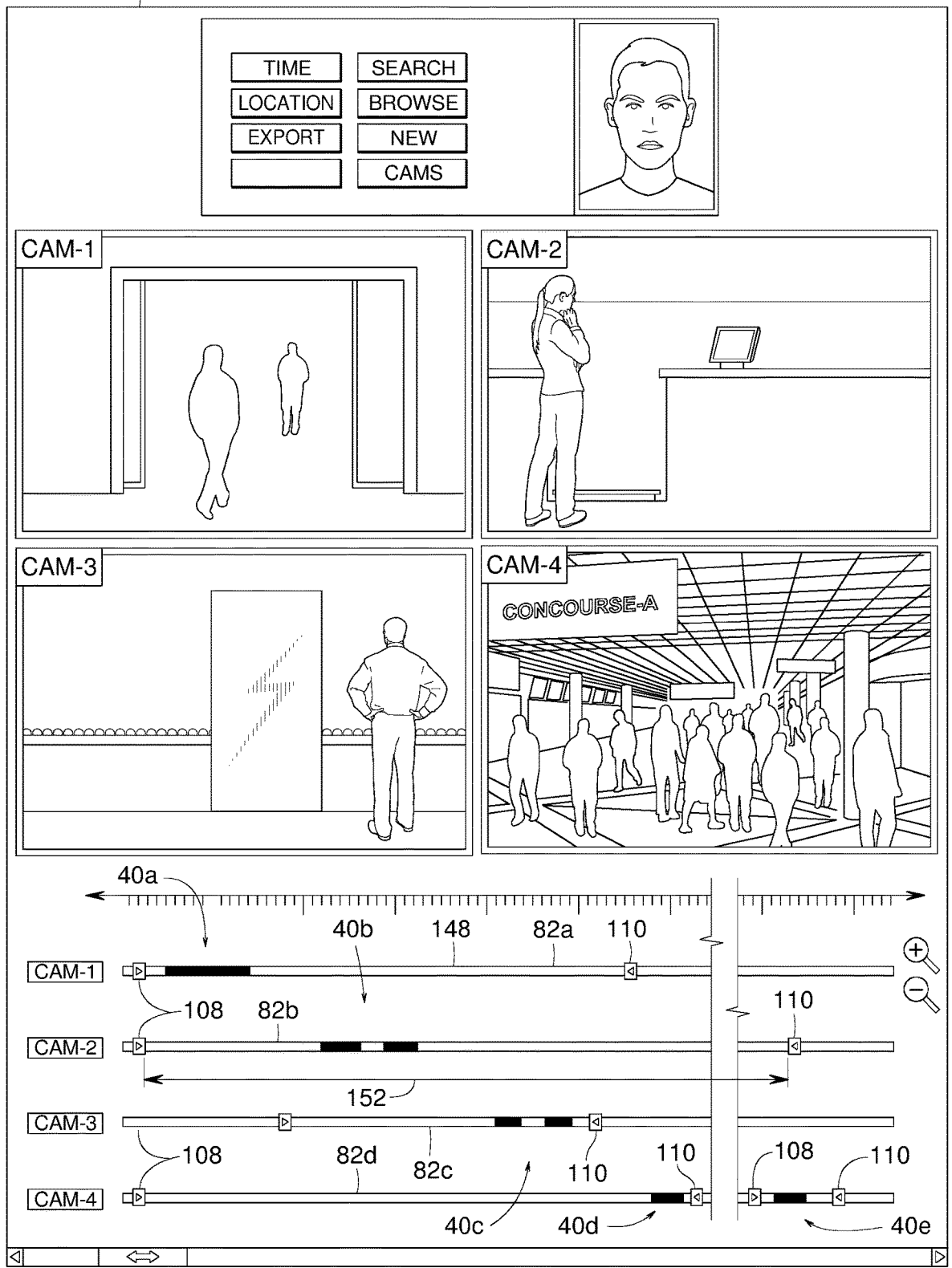
FIG. 20 is another example display screen shot of the video surveillance system of FIG. 1.

The method of defining the start and stop points of video clips 40a and 40b can also be used for establishing any number of additional video clips 40, such as video clips 40c of video track 82c and video clips 40d and 40e of video track 82d, as shown in FIG. 20. It can be noted that in the example of video track 82d, a non-detection period 118 (FIG. 17) between sighting shown in FIGS. 16 and 18 is so long (e.g., at least seven seconds or perhaps even hours) that video clips 40d and 40e are separated into two relevant video clips rather than combined into a single unnecessarily long one.

Figure 21:
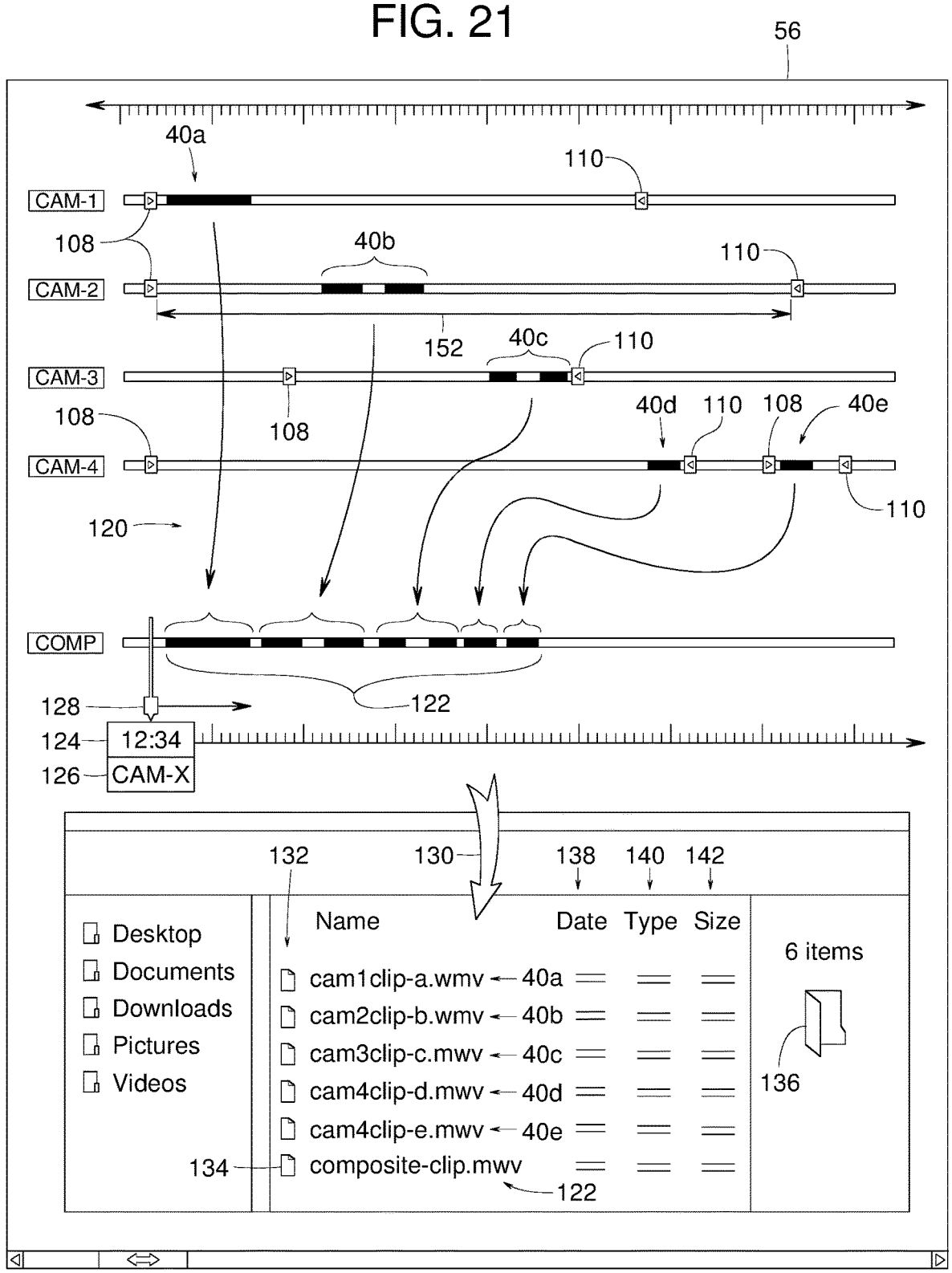
FIG. 21 is another example display screen shot of the video surveillance system of FIG. 1.

Video clips 40a-e, as identified in FIG. 20 are then batch extracted, which is illustrated by arrows 120 of FIG. 21. In some examples, the extracted video clips 40a-e are combined into a single composite video 122. In some examples, composite video 122 is stored on memory 44 such that when subsequently retrieved and viewed, video clips 40a-e are played in time order and identify which video camera 14 did the recording. Composite video 122 is convenient for later viewing in an efficient manner without having to watch an excessive amount of extraneous recorded material. In some examples, individual video frames of composite video 122 are associated with a corresponding time of recording 124 and/or associated with a corresponding video camera identification 126 (e.g., CAM-1, CAM-2, etc.). In some examples, the time 124 and/or camera association 126 are batch exported along with the batch exporting of video clips 40a-e. The time of recording 124 and video camera identification 126 change according to the position of a play head 128 along composite video 122.

In addition or alternatively, video clips 40a-e are batch exported 130 as a group of video files 132 corresponding to video clips 40a-e. In some examples, video files 132 also include a composite file 134 corresponding to composite video 122. Video files 132 and composite file 134 may be stored on memory 44 in a directory 136 and/or as separate video files sorted based on a date 138 of file creation, a type of file 140, a size of file 142, etc.

In some examples, video surveillance system 10 and computer assisted method 62 may include various additional features and functions. For instance, in some examples, processor 30 searches video streams 32 of certain chosen video cameras 14 and/or of certain chosen areas of facility 12. In some examples, processor 30 upon executing program code 54 creates one or more links or associations between a facial image of designated individual 36 and some other additional attributes of individual 36. Examples of such attributes include a color of the individual's shirt (e.g., green) and whether individual 36 is carry a bag. Upon searching video streams 32, processor 30 may identify individual 36 even though the individual's face is momentarily hidden. For example, processor 30 may determine that a sighted body with their face hidden is still individual 36 because of detecting the green shirt and/or the bag in a video frame that does not show the individual's face.

Some examples of video surveillance system 10 and/or computer assisted method 62 can be defined as follows:

Example-1

A computer assisted method for managing a plurality of video tracks, the computer assisted method comprising:
 displaying bar representations of the video tracks;
 defining search time windows by positioning a virtual play head at chosen locations along the bar representations;
 batch searching the video tracks within the search time windows for video clips with video frames that show a designated subject (e.g., designated individual, designated bag, a certain object, designated weapon, etc.); and
 within the search time windows, batch extracting video clips that include the video frames that show the designated subject.

Example-2

The computer assisted method of Example-1, wherein the designated subject is a face of a designated individual.

Example-3

The computer assisted method of Example-1, wherein the designated subject is a non-human object.

Example-4

The computer assisted method of Example-1, wherein the designated subject includes a face and a non-human object.

Example-5

A computer assisted method for managing a plurality of video tracks, the computer assisted method comprising:

displaying bar representations of the video tracks;
batch searching the video tracks for video clips with video frames that show a designated subject (e.g., designated individual, designated bag, designated object, designated weapon, etc.);
defining export time windows by positioning a virtual play head at chosen locations along the bar representations;
within the export time windows, batch extracting video clips that include the video frames that show the designated subject.

Example-6

The computer assisted method of Example-5, wherein the designated subject is a face of a designated individual.

Example-7

The computer assisted method of Example-5, wherein the designated subject is a non-human object.

Example-8

The computer assisted method of Example-5, wherein the designated subject includes a face and an object.

Example-9

A computer assisted method for managing a plurality of video tracks, the computer assisted method comprising:
displaying bar representations of the video tracks;
performing a first search of the video tracks for video clips with video frames that show a designated individual with certain facial characteristics;
identifying additional features associated with the designated individual (some examples of such additional features include a large bag, a small bag, a brown bag, a green shirt, an accompanying child, a weapon, etc.);
performing a second or additional search of the video tracks for video clips with video frames that show the additional features; and
exporting the video clips that show at least one of the designated individual and the additional features.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A computer assisted method for gathering video clips each containing an individual with characteristics matching one or more characteristics of a designated individual in a facility, wherein the video clips are extracted from a plurality of video streams, each video stream captured by a corresponding one of a plurality of video cameras of a video surveillance system of the facility, the method comprising:
storing a plurality of characteristics including one or more facial characteristics of a designated individual;
executing a search algorithm on a computing device, the search algorithm searching the plurality of video streams for video frames that include an individual with a face with facial characteristics that match one or more of the facial characteristics of the designated individual, resulting in a sighted individual;
identifying one or more non-facial characteristics of the sighted individual;
associating the identified one or more non-facial characteristics of the sighted individual with the sighted individual;
when the face of the sighted individual becomes hidden from view, continuing to search for video frames that include the sighted individual by searching for an individual with one or more non-facial characteristics that match one or more of the non-facial characteristics that are associated with the sighted individual;
for each video stream that has at least one video frame that includes the sighted individual, extracting one or more video clips from the respective video stream, wherein each of the extracted video clips include one or more video frames containing the sighted individual; and
exporting the video clips to a designated location on a storage device.

2. The computer assisted method of claim 1, wherein the exporting of the video clips is a batch export that is initiated by a user selecting an export button on a User Interface (UI).

3. The computer assisted method of claim 1, wherein identifying one or more of the non-facial characteristics that are associated with the sighted individual are extracted from one or more video frames where the face of the sighted individual is not hidden from view.

4. The computer assisted method of claim 1, wherein identifying one or more of the non-facial characteristics that are associated with the sighted individual are manually entered by a user via a User Interface (UI).

5. The computer assisted method of claim 1, wherein each video clip includes one or more sightings of the sighted individual.

6. The computer assisted method of claim 1, wherein:
when a time period between two successive sightings of the sighted individual is greater than a threshold time period, each of the two successive sightings are extracted and put into a separate video clip; and
when the time period between two successive sightings of the sighted individual is less than the threshold time period, each of the two successive sightings are extracted and put into a common video clip.

7. The computer assisted method of claim 1, wherein the one or more non-facial characteristics of the sighted individual comprise one or more of a clothing type and a clothing color.

8. The computer assisted method of claim 1, wherein the one or more non-facial characteristics of the sighted individual comprise one or more of the individual's height, weight, race, age, gender, and walking gait.

9. The computer assisted method of claim 1, wherein the one or more non-facial characteristics of the sighted individual comprise one or more of a color and/or type of a bag carried or towed by the sighted individual.

10. The computer assisted method of claim 1, wherein the one or more non-facial characteristics of the sighted individual comprise an activity of the sighted individual.

11. The computer assisted method of claim 10, wherein the activity comprises one or more of sitting, walking, running and loitering.

12. A computer assisted method for gathering video clips each containing a group of individuals with characteristics that match one or more group characteristics, wherein the video clips are extracted from a plurality of video streams with each video stream captured by a corresponding one of a plurality of video cameras of a video surveillance system of a facility, the method comprising:

storing a plurality of group characteristics of a group of individuals;

executing a search algorithm on a computing device, wherein the search algorithm searches the plurality of video streams for video frames that include a group of individuals with group characteristics that match the plurality of group characteristics resulting in a sighted group of individuals;

for each video stream that has at least one video frame that includes the sighted group of individuals, extracting one or more video clips from the respective video stream, wherein each extracted video clip includes one or more video frames containing the sighted group of individuals; and batch exporting of the video clips to a designated location on a storage device.

13. The computer assisted method of claim 12, wherein the plurality of group characteristics include:
a first individual has a first clothing type and/or a first clothing color; and
a second individual has a second clothing type and/or a second clothing color.

14. The computer assisted method of claim 12, wherein the plurality of group characteristics include:
a first individual has an estimated age that is below a first threshold age; and
a second individual has an estimated age that is above a second threshold age.

15. The computer assisted method of claim 12, wherein the plurality of group characteristics include an activity of a group of individuals.

16. The computer assisted method of claim 15, wherein the activity of the group of individuals includes a first individual setting down an item and a second individual picking up the item.

17. A computer assisted method for gathering video clips each containing an individual with characteristics matching one or more characteristics of a designated individual in a facility, wherein the video clips are extracted from a plurality of video streams, each video stream captured by a corresponding one of a plurality of video cameras of a video surveillance system of the facility, the method comprising:

executing a search algorithm on a computing device, the search algorithm searching the plurality of video streams for video frames that include an individual that matches one or more characteristics resulting in a sighted individual;

for each video stream that has at least one video frame that includes the sighted individual, extracting one or more video clips from the respective video stream, wherein each of the extracted video clips include one or more video frames containing the sighted individual, wherein:
when a time period between two successive sightings of the sighted individual is greater than a threshold time period, each of the two successive sightings are extracted and put into a separate video clip;
when the time period between two successive sightings of the sighted individual is less than the threshold time period, each of the two successive sightings are extracted and put into a common video clip; and
exporting the video clips to a designated location on a storage device.

18. The computer assisted method of claim 17, wherein the exporting of the video clips is a batch export that is initiated by a user selecting an export button on a User Interface (UI).

19. The computer assisted method of claim 17, wherein the exporting of the video clips comprises combining the video clips and an association of each of the video clips with a respective one of the plurality of video cameras into a composite video file such that when the composite video file is subsequently retrieved and viewed by security personnel the video clips are played in time order and identify which video camera did the recording.

20. The computer assisted method of claim 17, wherein the exporting of the video clips comprises saving the video clips and an association of the video clips with a respective one of the plurality of video cameras individually into a directory on a storage device as a group of video files for viewing individually by security personnel.

* * * * *